United States Patent
Shimizu et al.

(10) Patent No.: US 7,345,815 B2
(45) Date of Patent: Mar. 18, 2008

(54) ILLUMINATION APPARATUS FOR MICROSCOPE

(75) Inventors: Keiji Shimizu, Fussa (JP); Minoru Sukekawa, Hachioji (JP); Kazuhiro Hayashi, Akishima (JP); Tsuyoshi Mochizuki, Hino (JP)

(73) Assignee: Olympus Corporation, Tokyo (JP)

( * ) Notice: Subject to any disclaimer, the term of this patent is extended or adjusted under 35 U.S.C. 154(b) by 173 days.

(21) Appl. No.: 11/113,381

(22) Filed: Apr. 22, 2005

(65) Prior Publication Data
US 2005/0243413 A1 Nov. 3, 2005

(30) Foreign Application Priority Data
Apr. 28, 2004 (JP) .............................. 2004-134375
Dec. 10, 2004 (JP) .............................. 2004-359111

(51) Int. Cl.
G02B 21/06 (2006.01)
(52) U.S. Cl. ........................ 359/388; 359/385; 359/601
(58) Field of Classification Search ................. None
See application file for complete search history.

(56) References Cited
U.S. PATENT DOCUMENTS 4,221,867 A * 9/1980 McFadden .................. 435/32
4,659,193 A 4/1987 Nagano
6,040,940 A * 3/2000 Kawasaki .................. 359/389
2002/0191281 A1 12/2002 Osa et al.
2004/0207915 A1* 10/2004 Kaneda ...................... 359/388

FOREIGN PATENT DOCUMENTS

| EP | 1 469 333 A1 | 10/2004 |
| JP | 7-122694 B2 | 12/1995 |
| JP | 3194909 B2 | 6/2001 |

* cited by examiner

*Primary Examiner*—Stephone B. Allen
*Assistant Examiner*—Derek S. Chapel
(74) *Attorney, Agent, or Firm*—Frishauf, Holtz, Goodman & Chick, P.C.

(57) ABSTRACT

A transmission illumination apparatus for a microscope has an optically transparent sample mount plate on which a sample is mounted, a surface light source that projects substantially uniform illumination light toward the sample mount plate, and a light orientation member that restricts diffusion of the illumination light in relation to at least one direction.

25 Claims, 24 Drawing Sheets

Cross section in Y direction

Cross section in X direction

Cross section in Y direction

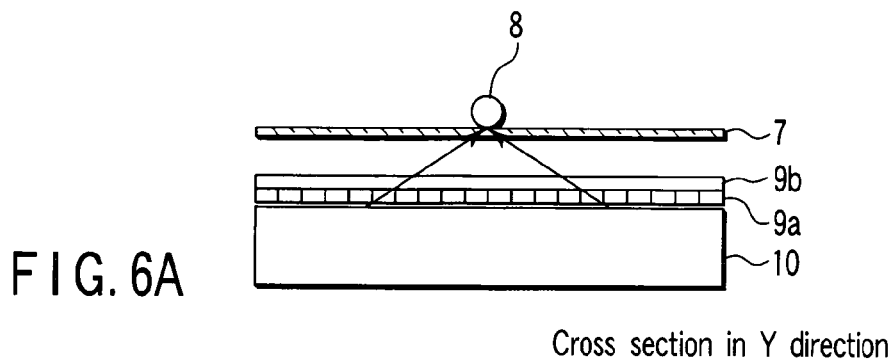
FIG. 6A  Cross section in Y direction
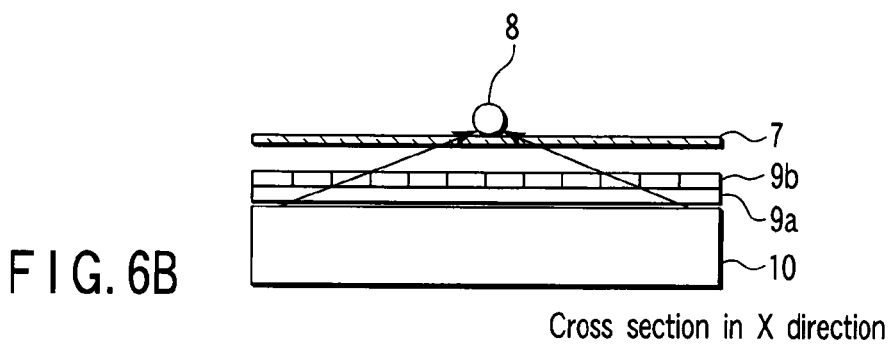
FIG. 6B  Cross section in X direction
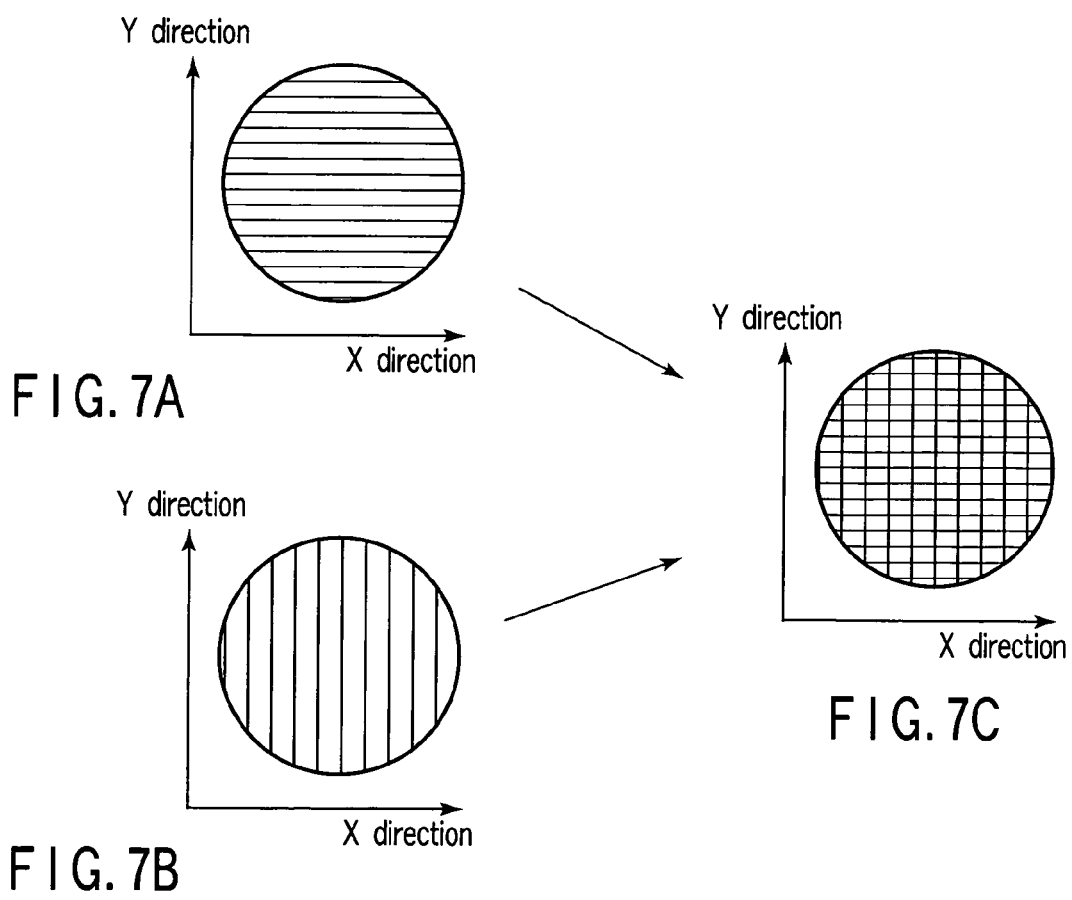
FIG. 7A
FIG. 7B
FIG. 7C

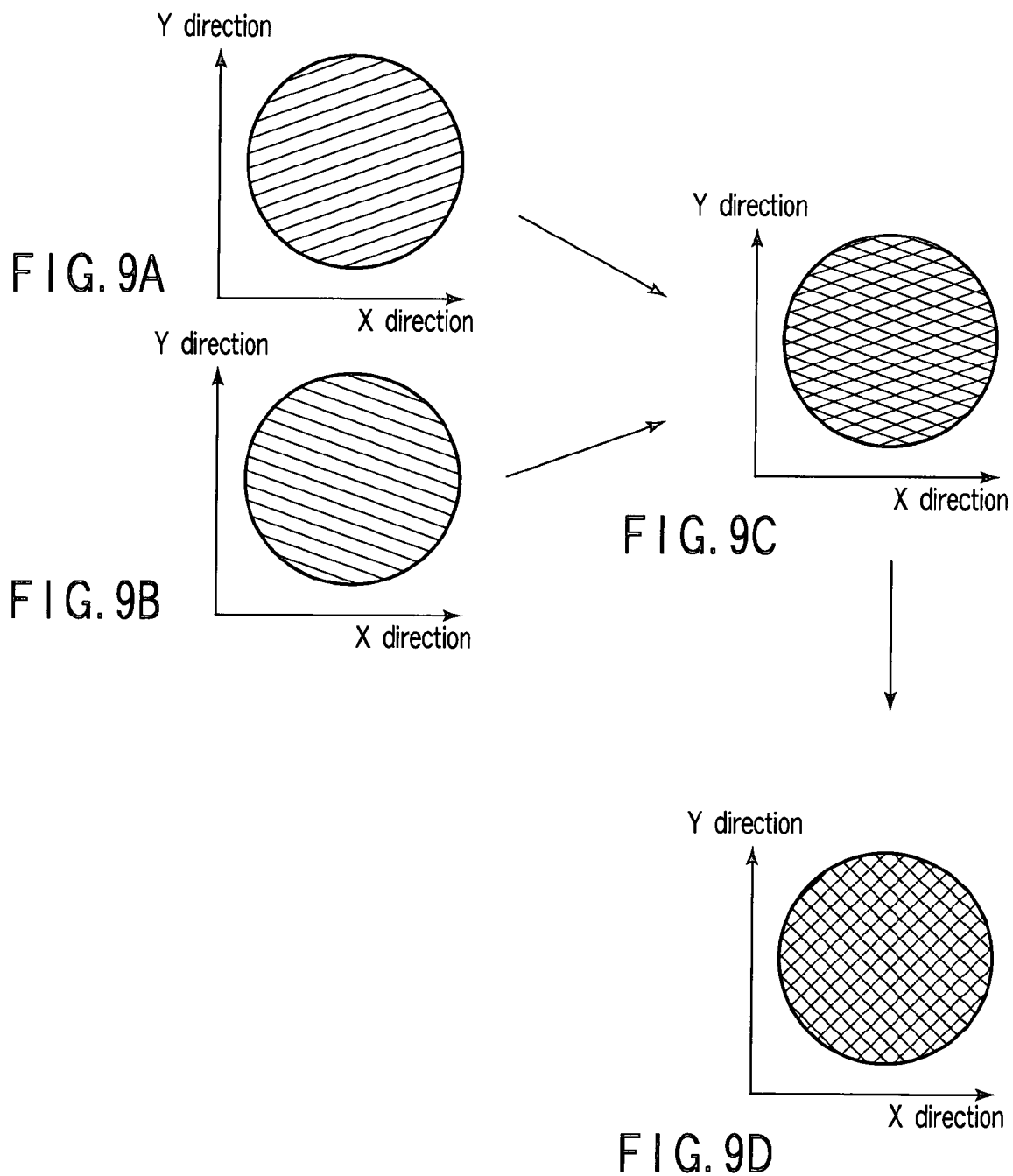

Cross section in Y direction

Cross section in Y direction

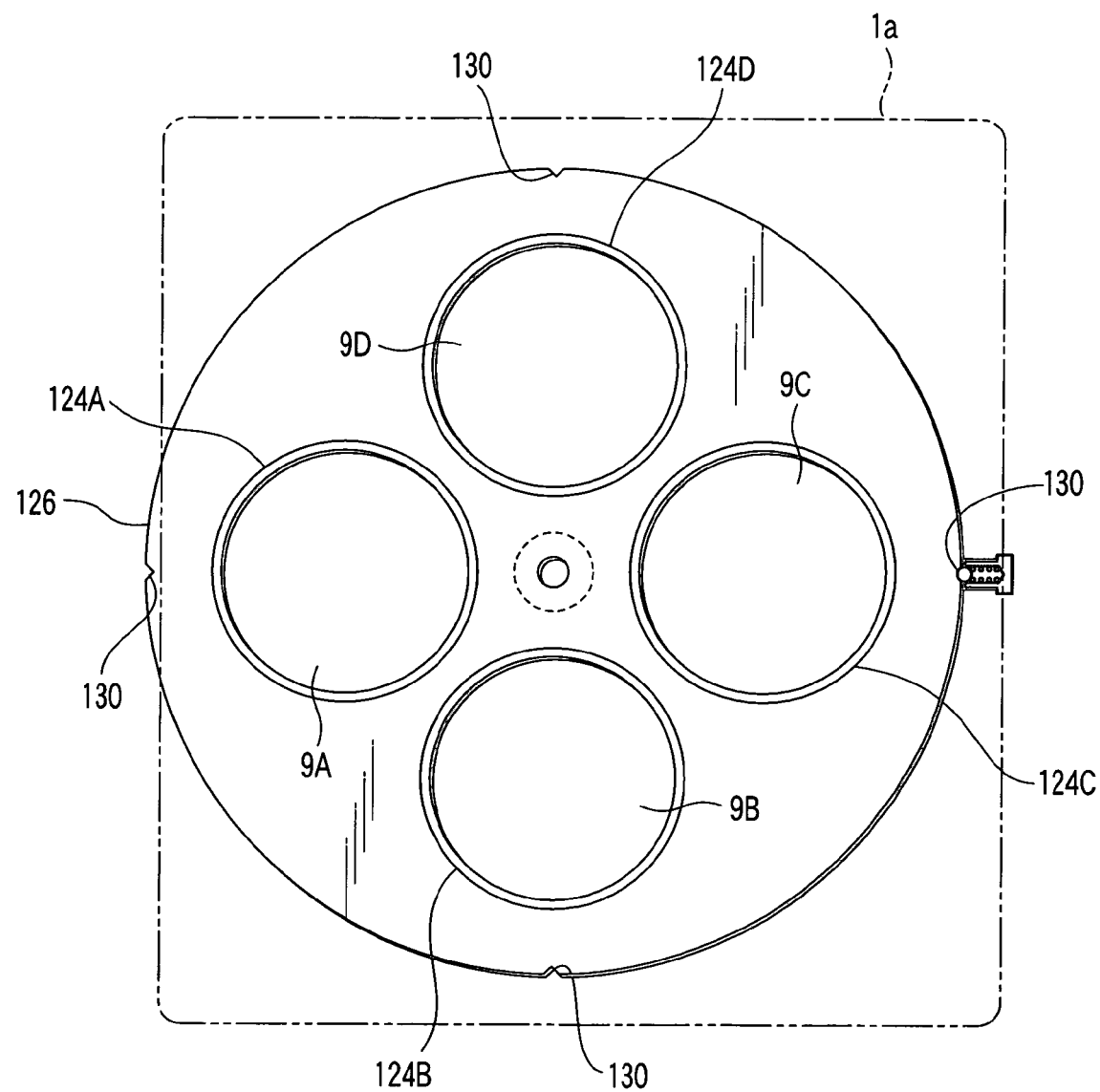
F I G. 13

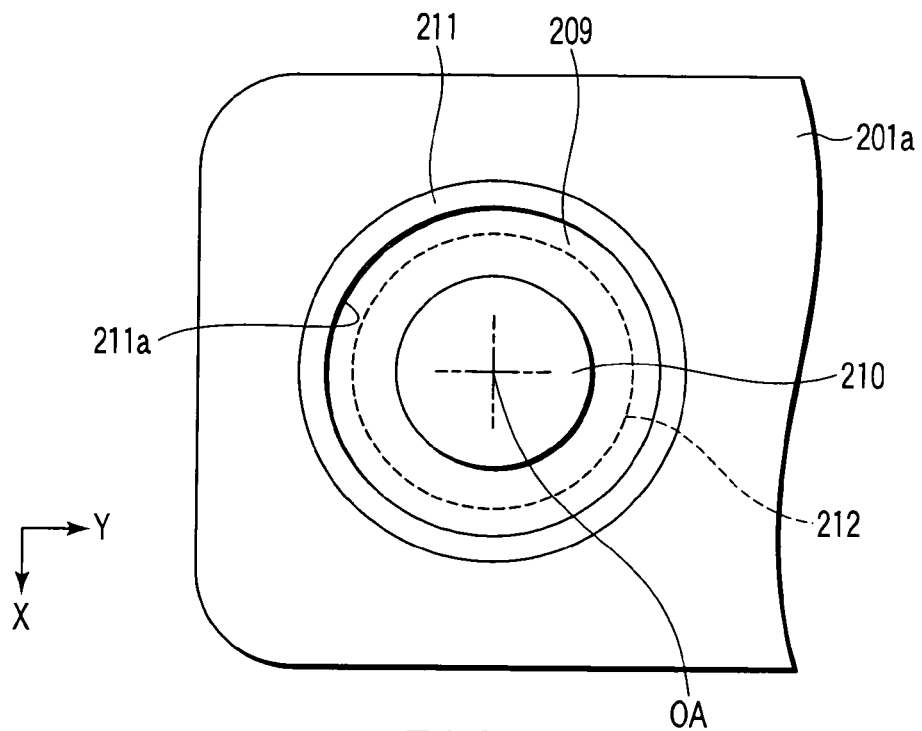
F I G. 15
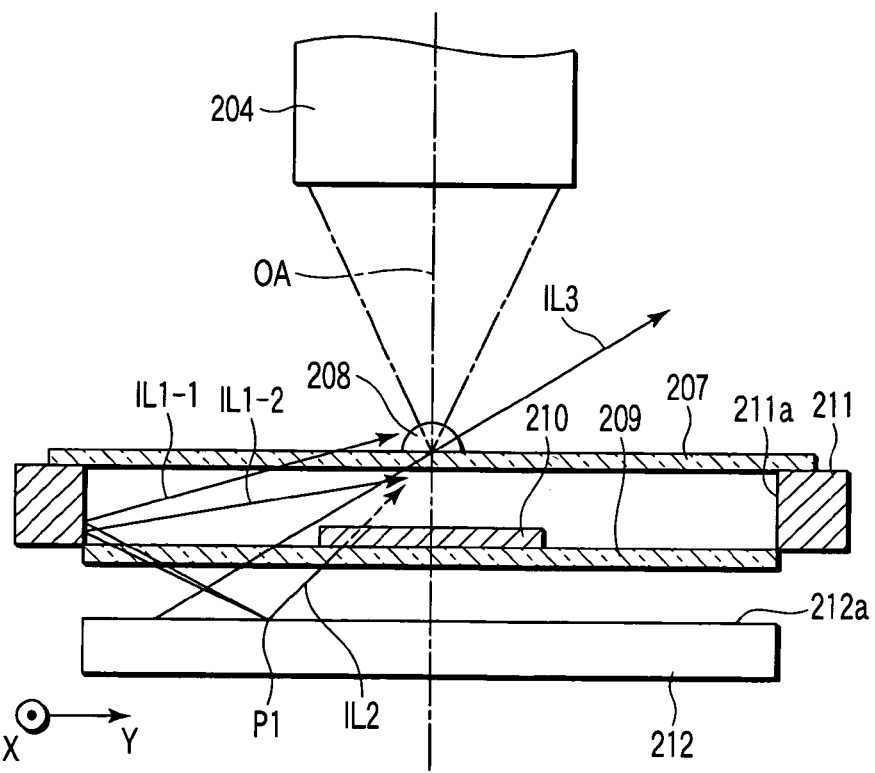
F I G. 16

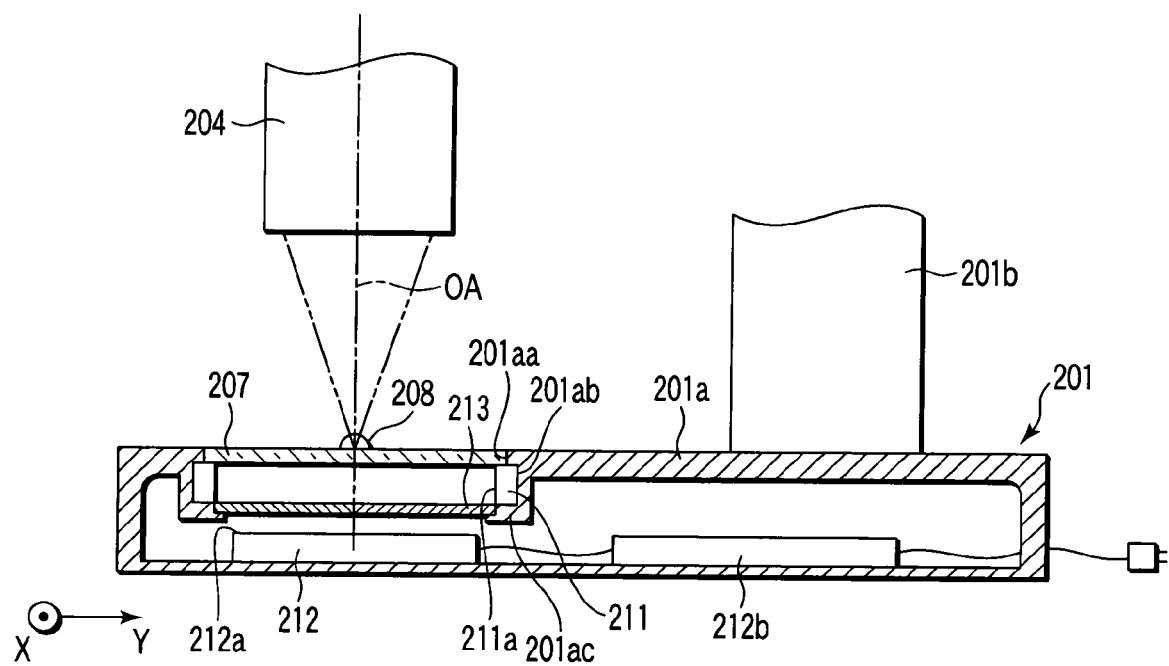
F I G. 17

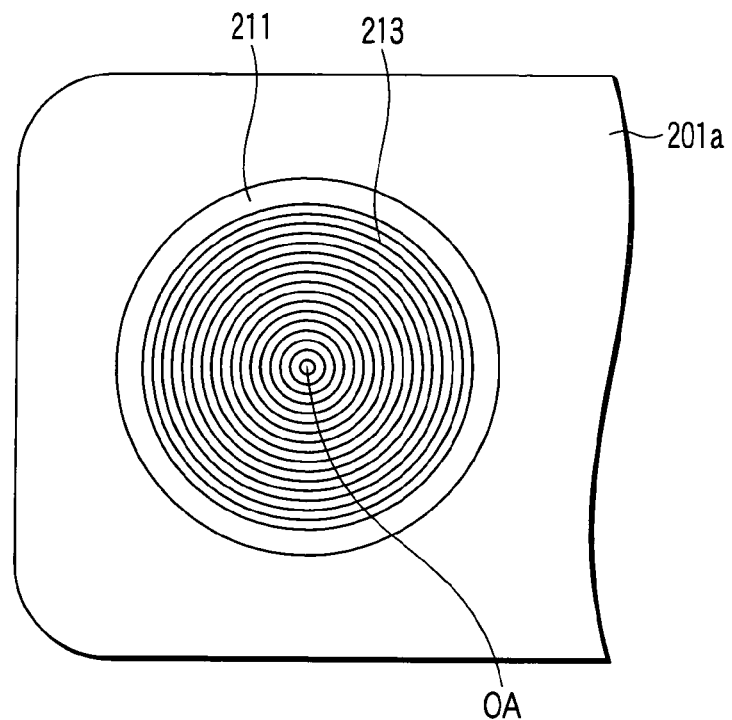
F I G. 19
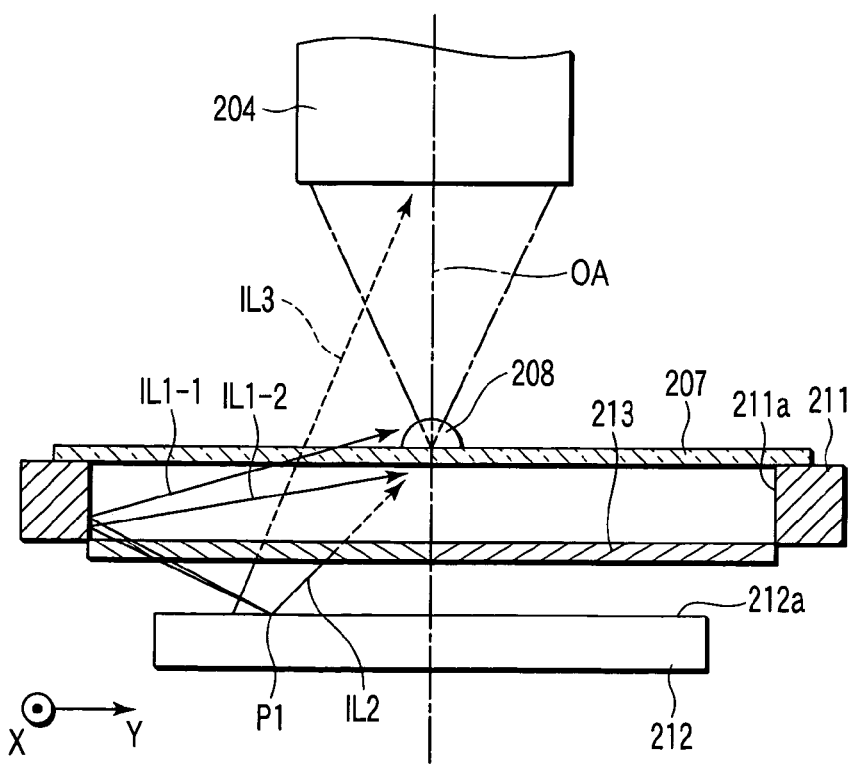
F I G. 20

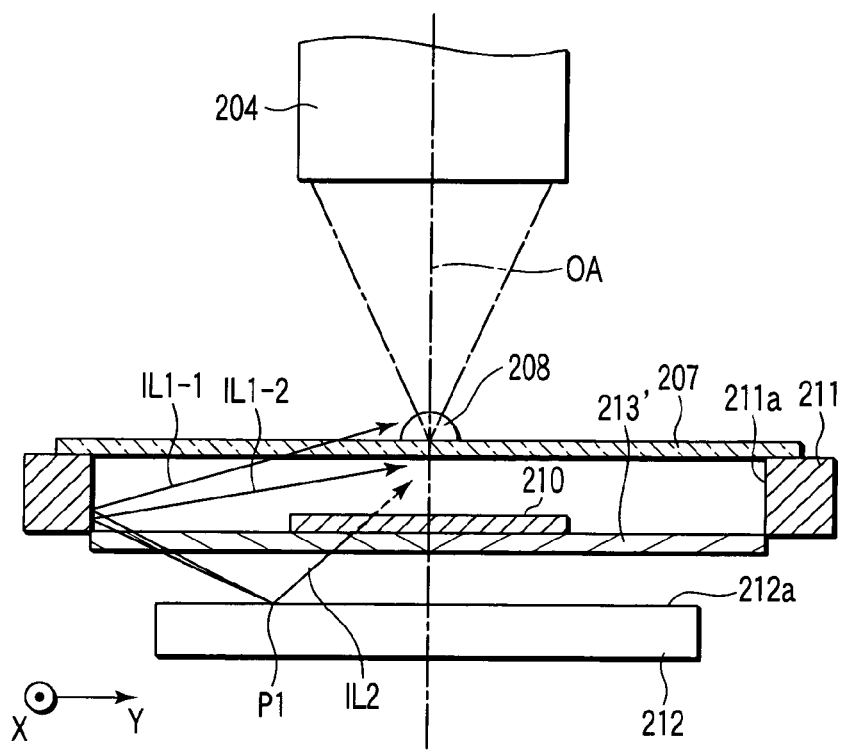
F I G. 21
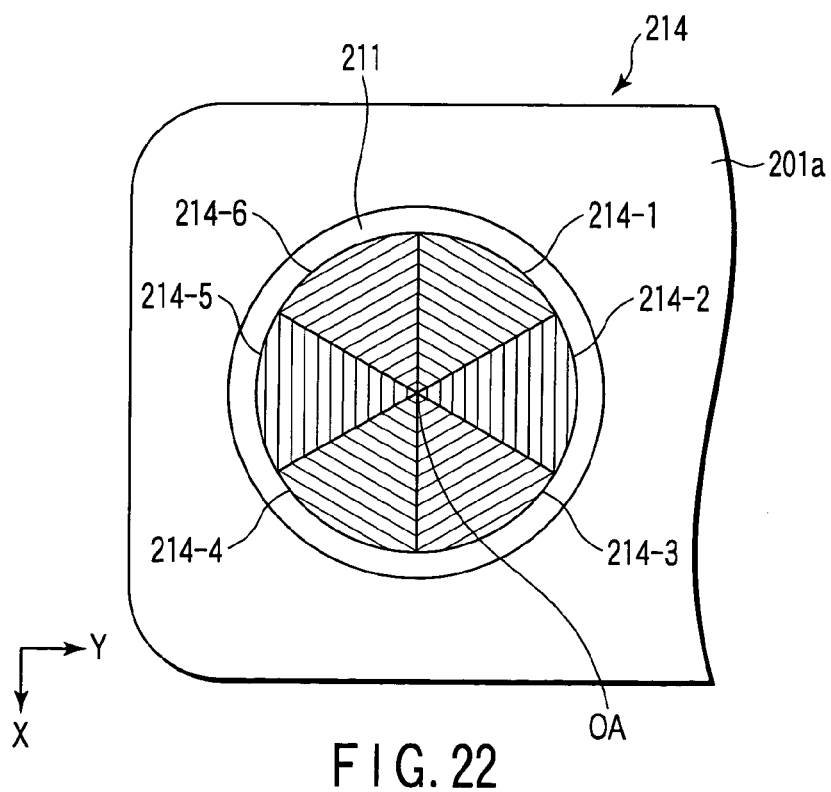
F I G. 22

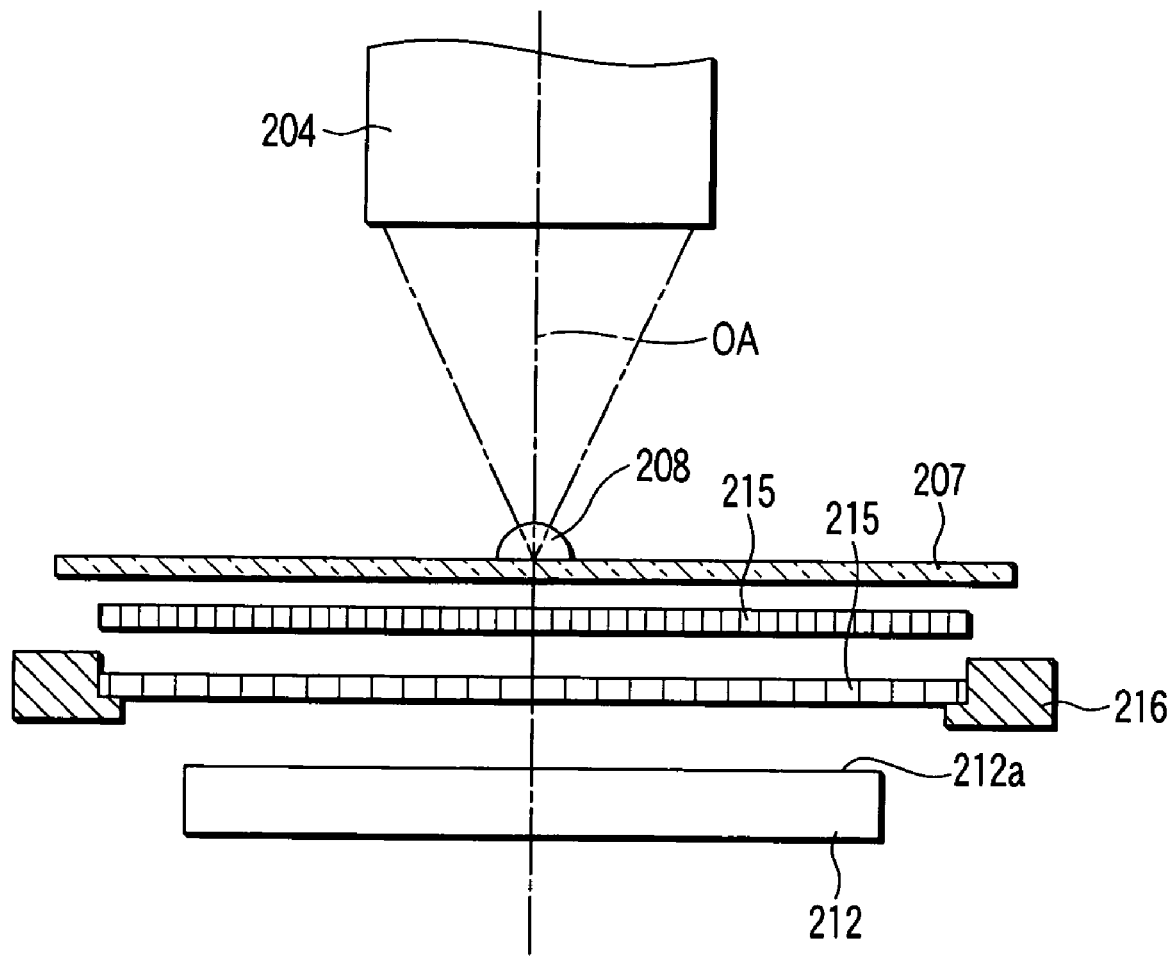
F I G. 32

ILLUMINATION APPARATUS FOR MICROSCOPE

CROSS-REFERENCE TO RELATED APPLICATIONS

This application is based upon and claims the benefit of priority from prior Japanese Patent Applications No. 2004-134375, filed Apr. 28, 2004; and No. 2004-359111, filed Dec. 10, 2004, the entire contents of both of which are incorporated herein by reference.

BACKGROUND OF THE INVENTION

1. Field of the Invention

The present invention relates to an illumination apparatus for a microscope.

2. Description of the Related Art

There has been conventionally known that a substantially even planar light source is used as illumination light source for a microscope.

For example, Japanese Patent No. 3194909 discloses a microscope using a planar fluorescent lamp for illumination of a microscope.

Further, Jpn. Pat. Appln. KOKAI Publication No. 7-122694 discloses a planar light source in which a light diffuser is arranged between a light source having LEDs aligned in an array and a sample.

Furthermore, a light source having a diffuser with an increased surface is used in order to cover an illumination range with a low magnification of, e.g., a stereoscopic microscope.

BRIEF SUMMARY OF THE INVENTION

The present invention is directed to an illumination apparatus for a microscope. An illumination apparatus according to the present invention has an optically transparent sample mount plate on which a sample is mounted, a surface light source that projects substantially uniform illumination light toward the sample mount plate, and a light orientation member that restricts diffusion of the illumination light in relation to at least one direction.

Another illumination apparatus according to the present invention has a surface light source that has a light projection surface from which emitted light is projected, and projects illumination light with a projection angle in a predetermined range that is substantially rotation-symmetrical with respect to an optical axis vertical to the light projection surface; a light shielding plate that is arranged between a sample arranged facing the light projection surface and the light projection surface, and shields light that is directly applied to the sample from the light projection surface; and a reflection illumination member that is arranged around the optical axis between the sample and the light projection surface, and reflects the illumination light to illuminate the sample.

A still another illumination apparatus according to the present invention has a surface light source that has a light projection surface from which emitted light is projected, and projects illumination light with a projection angle in a predetermined range that is substantially rotation-symmetrical with respect to an optical axis vertical to the light projection surface; at least one light orientation member that is arranged between a sample arranged facing the light projection surface and the light projection surface, and restricts a transmission angle of light projected from the light projection surface in a plane containing at least the optical axis; and a reflection illumination member that is arranged around the optical axis between the sample and the light orientation member, and reflects the illumination light transmitted through the light orientation member to illuminate the sample.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 6A schematically shows a cross section in the Y direction of a transmission illumination apparatus of a second modification of the first embodiment according to the present invention;

FIG. 6B schematically shows a cross section in the X direction of the transmission illumination apparatus of the second modification of the first embodiment according to the present invention;

FIG. 7A is a plan view of an upper louver film unit depicted in FIGS. 6A and 6B;

FIG. 7B is a plan view of a lower louver film unit depicted in FIGS. 6A and 6B;

FIG. 7C shows a state in which the louver film depicted in FIG. 7A and the louver film depicted in FIG. 7B are overlapped;

FIG. 9A is a plan view of an upper louver film unit depicted in FIG. 8;

FIG. 9B is a plan view of a lower louver film unit depicted in FIG. 8;

FIG. 9C shows a state in which the louver film depicted in FIG. 9A and the louver film depicted in FIG. 9B are overlapped;

FIG. 9D shows a state in which the louver film depicted in FIG. 9A and the louver film depicted in FIG. 9B are overlapped with a different inclination with respect to the X direction;

FIG. 13 is a top view of a turret depicted in FIG. 12;

FIG. 15 is a plan view showing a configuration of the illumination apparatus depicted in FIG. 14;

FIG. 16 is a cross-sectional view illustrating an illumination state by the illumination apparatus depicted in FIG. 14;

FIG. 17 is a schematic view showing a configuration of an illumination apparatus according to a fifth embodiment of the present invention;

FIG. 19 is a plan view showing a configuration of the illumination apparatus depicted in FIG. 17;

FIG. 20 is a cross-sectional view illustrating an illumination state by the illumination apparatus depicted in FIG. 17;

FIG. 21 is a cross-sectional view showing a modified configuration of the illumination apparatus according to the fifth embodiment of the present invention;

FIG. 22 is a plan view showing a configuration of the light orientation member depicted in FIG. 21;

FIG. 32 is a cross-sectional view illustrating an effect on the shadow and illumination light quantity by the light orientation member depicted in FIG. 30;

DETAILED DESCRIPTION OF THE INVENTION

Embodiments according to the present invention will now be described hereinafter with reference to the accompanying drawings.

First Embodiment

Figure 1:
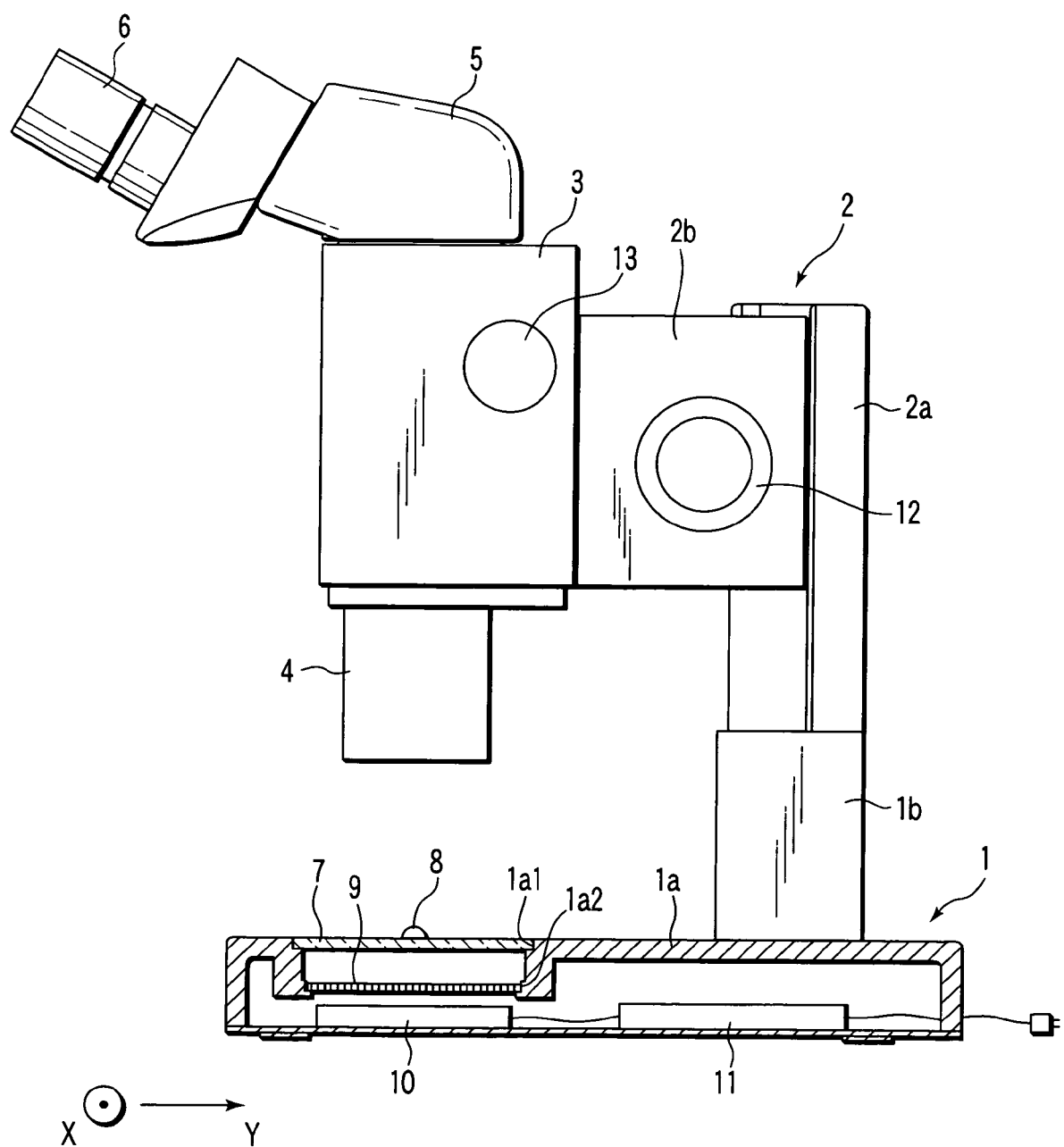
FIG. 1 schematically shows a microscope having a built-in transmission illumination apparatus according to a first embodiment of the present invention.

FIG. 1 schematically shows a microscope having a built-in transmission illumination apparatus according to a first embodiment of the present invention.

A transmission illumination stand 1 as a microscope stand has a base portion 1a arranged in the horizontal direction, and a support column portion 1b provided upright with respect to the base portion 1a. The support column portion 1b is provided with a sighting device 2. The sighting device 2 has a non-illustrated built-in sighting mechanism, and the sighting mechanism is used to move up and down a movable portion 2b with respect to a fixed portion 2a in accordance with an operation of a sighting handle 12. The movable portion 2b of the sighting device 2 is provided with a zoom main body 3, and the zoom main body 3 allows varying a magnification in accordance with an operation of a zoom handle 13. A lower portion of the zoom main body 3 is provided with a objective lens 4. An upper portion of the zoom main body 3 is provided with a body tube 5, and the body tube 5 is provided with an eyepiece lens 6 for observation.

Moreover, a hole portion 1a1 is formed on an upper surface of the base portion 1a, which faces the objective lens 4. A glass plate 7, which is an optically transparent sample mount plate on which a sample 8 is mounted, is fitted in the hole portion 1a1. A surface light source 10, which projects substantially uniform illumination light toward the glass plate 7, is provided below the glass plate 7. A power supply 11 is connected to the surface light source 10, a non-illustrated commercial power source is connected to the power supply 11, and the power is supplied to the surface light source 10 by a non-illustrated switch. A light orientation member 9 is provided between the glass plate 7 and the surface light source 10. The light orientation member 9 restricts diffusion of illumination light projected from the surface light source 10 in relation to at least one direction.

The light orientation member 9 is supported by a holding portion 1a2 formed to the base portion 1a.

That is, the transmission illumination apparatus according to this embodiment comprises the glass plate 7 on which the sample 8 is mounted, the surface light source 10 that projects substantially uniform illumination light toward the glass plate 7, and the light orientation member 9 that restricts diffusion of illumination light projected from the surface light source 10 in relation to at least one direction.

In the following description, a right-and-left direction seen from a microscopic examiner side (a direction vertical to the page space of FIG. 1) is determined as an X direction and a lengthwise direction (a right-and-left direction of the page space of FIG. 1) is determined as a Y direction.

Figure 2:
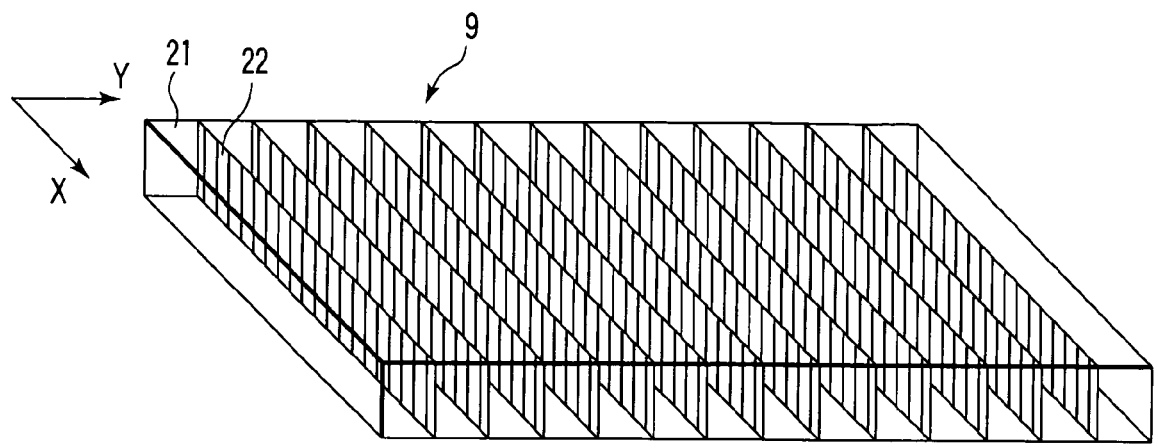
FIG. 2 is a perspective view schematically showing a configuration of a louver film depicted in FIG. 1.

The light orientation member 9 comprises a louver film. FIG. 2 is a perspective view schematically showing a configuration of the louver film. As shown in FIG. 2, the louver film 9 comprises an parallel-plate type transparent resin 21 that is optically transparent, and many optically opaque micro louvers 22 that are arranged in the transparent resin 21 at equal intervals. The micro louvers 22 of the louver film 9 are perpendicular to the parallel planes of the transparent resin 21. Such a louver film is commercial available from, e.g., Sumitomo 3M Ltd. or Shin-Etsu Polymer Co., Ltd. Although the louver film 9 shown in FIG. 2 is drawn in a rectangular shape in order to schematically illustrate its configuration, the louver film 9 may have a circular shape or the like in accordance with the shape of the surface light source 10.

With respect to the microscope shown in FIG. 1, the louver film 9 is arranged in such a manner that the micro louvers 22 become parallel to the X direction as shown in FIG. 2, for example. Such an arrangement is particularly beneficial when the microscope is a binocular stereoscopic microscope as will be described later.

An effect of the microscope according to this embodiment having such a configuration will now be described.

Focusing with respect to the sample 8 on the glass plate 7 is adjusted by rotating the sighting handle 12 while looking through the eyepiece lens 6 by an observer so that the zoom main body 3 and the objective lens 4 are moved up and down together with the movable portion 2b of the sighting device 2. Here, a magnification of an observed sample image can be increased/reduced within an arbitrary range by changing a magnification in the zoom main body 3 while rotating the zoom handle 13.

When the switch (not shown) of the power supply 11 is turned on so that the power is supplied to the surface light source 10, a diffusion light is emitted from the surface light source 10, and the light transmitted through the louver film 9 illuminates the sample 8 on the glass plate 7.

Figure 3A:
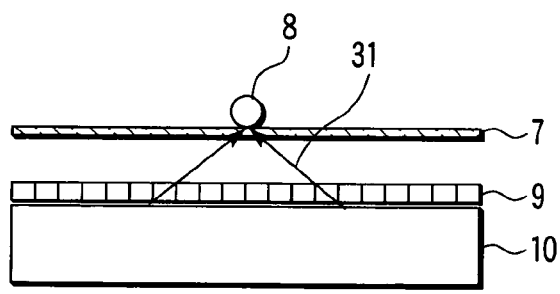
FIG. 3A schematically shows a cross section in a Y direction of the transmission illumination apparatus according to the first embodiment of the present invention.
Figure 3B:
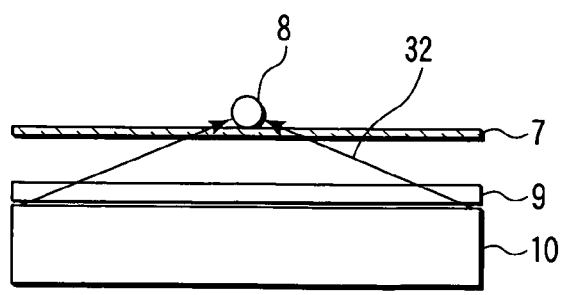
FIG. 3B schematically shows a cross section in an X direction of the transmission illumination apparatus according to the first embodiment of the present invention.

FIG. 3A schematically shows a cross section in the Y direction of the transmission illumination apparatus according to this embodiment, and FIG. 3B schematically shows a cross section in the X direction of the transmission illumination apparatus of this embodiment. In FIGS. 3A and 3B, illumination light projected from the surface light source 10 enters the louver film 9. As shown in FIG. 3A, in the cross section along the Y direction, the illumination light having a large incidence angle is shielded by the micro louvers 22 and does not reach the sample 8. Therefore, the sample 8 is illuminated with the illumination light having a relatively small incidence angle. Arrows denoted by reference numeral 31 in FIG. 3A indicate the illumination light having a maximum incidence angle that can be illuminate the sample 8. On the other hand, as shown in FIG. 3B, in the cross section along the X direction, since illumination light projected from the surface light source 10 is parallel to the micro louvers 22 and hence it is not shielded. Therefore, the sample 8 is illuminated with the illumination light having an incidence angle smaller than the possible maximum incidence angle that can be obtained by the surface light source 10, i.e., the illumination light having all incidence angles projected from the surface light source 10.

When the sample 8 is illuminated with the illumination light having a small incidence angle as shown in FIG. 3A, an angle of a refracted light or a scattered light by the sample 8 is also restricted. Therefore, there occurs a case where the refracted light or the scattered light does not reach the objective lens 4, and hence the shadow is generated in an observation image of the sample 8. On the other hand, when the sample 8 is illuminated with the illumination light having a large incidence angle as shown in FIG. 3B, since the illumination light with various incidence angles falls on the sample 8, the refracted light or the scattered light by the sample 8 is also generated at various angles. Therefore, since a quantity of light that reaches the objective lens 4 is large, the shadow is hardly generated in the observation image of the sample 8. That is, the shade is generated in an image of the sample 8 observed through the eyepiece lens 6 in the Y direction, but there is obtained an observation image in which no shadow is generated in the X direction. The shadow generated in the Y direction enables observation even if the sample 8 is relatively transparent.

An intensity of the shadow can be controlled by using each interval (a pitch) between the micro louvers 22 of the louver film 9. The light shielding effect is increased and an illumination angle becomes smaller as the pitch becomes finer, and hence the shadow with a higher intensity can be provided to the sample 8.

In this embodiment, a length D of a shortest side of a light emission portion of the surface light source 10, a distance L from a sample mount surface or upper surface of the glass plate 7 to a light emission surface of the surface light source 10, and a maximum angle (a half angle) A of illumination light that falls on the sample 8 satisfy following conditional expressions:

$L<0.7D$ $A<0.9\tan^{-1}(D/2L)$, so that the shadow is provided to the sample 8 to facilitate observation. The expression $L<0.7D$ represents that the distance between the sample mount surface and the surface light source 10 is close, and the maximum angle (the half angle) A of the illumination light that falls on the sample 8 under this circumstance can satisfy the following condition, $A<0.9\tan^{-1}(D/2L)$.

That is, the maximum angle A can be reduced by 10% or more as compared with the case where the surface light source 10 is arranged as it is.

In other words, even though the surface light source 10 is arranged at a short distance, there can be obtained the effect as if the surface light source 10 is arranged at a long distance.

As a specific example, when the surface light source having a diameter of 50 mm is used, the length D of the shortest side of the light emission portion of the surface light source 10 is 50 mm.

Based on L<0.7D, the distance L from the sample mount surface to the light emission surface is less than 35 mm.

Based on A<0.9 tan$^{-1}$(D/2L), the maximum angle A of the illumination light that falls on the sample 8 is less than 32°.

Accordingly, the maximum angle A of the illumination light is obtained when the distance from the sample mount surface to the light emission surface is smaller than 35 mm and the surface light source 10 is arranged at a longer distance than 40 mm. When the surface light source having a diameter of 50 mm is just arranged at a position distanced away by 35 mm, the maximum angle of the illumination light that falls on the sample 8 becomes 35.5°.

A binocular stereoscopic microscope generally has two optical axes each of which has an inward angle and that are aligned in the X direction for a right eye and a left eye. In the binocular stereoscopic microscope, when the shadow is generated in the X direction of the sample 8, how the shadow is generated differs depending on the two optical axes because the two optical axes have different angles. As a result, the shadows of images of the sample 8 that are respectively observed through the right and left eyepiece lenses 6 are different, thereby making it hard to see the images. Therefore, it is preferable that the shadow is not generated in the right-and-left direction (the X direction) of the images with respect to the binocular stereoscopic microscope. That is, when the microscope is the binocular stereoscopic microscope, it is good enough for the light orientation member, i.e., the louver film 9 to restrict diffusion of the illumination light in relation to a direction vertical to the plane that contains the two optical axes of the binocular stereoscopic microscope.

Additionally, in a state where the louver film 9 is not provided, since the illumination light falls on the sample 8 with a large incidence angle in both the X direction and the Y direction, the shadow is not generated in the image. In order to obtain an incidence angle equivalent to that shown in FIG. 3A without the louver film 9, the distance between the surface light source 10 and the sample 8 must be increased. In order to provide an appropriate shadow, assuming that D is a size of the light emission surface of the surface light source 10, the surface light source 10 and the sample 8 must be separated from each other by a distance of 0.5D or above, preferably 0.8D or above.

Even if the distance between the surface light source 10 and the sample 8 is increased in this manner, the shadow is generated in all of the X direction and the Y direction, and hence a difference is generated between images observed through the right and left eyepiece lenses 6 in the observation using the binocular stereoscopic microscope, thereby making it hard to see the images.

As described above, according to this embodiment, an appropriate shadow is generated in the images of the sample 8 even if the surface light source 10 is arranged in the vicinity of the sample 8 by the louver film 9. Therefore, the observation is enabled even in case of a relatively transparent sample. Further, since a thickness of the base portion 1a of the transmission illumination stand 1 can be reduced, a large movement in the vertical direction that is required in a remounting operation of the sample 8 or the like can be reduced, thereby obtaining the excellent workability.

Furthermore, in a work such as a sample operation while performing the observation, a position of hands can be lowered and an eye point can be also lowered, thereby lessening fatigue of an observer.

Moreover, since the shadow is generated to the sample 8 in the Y direction only, a difficulty in observation is not involved even if this embodiment is applied to the binocular stereoscopic microscope, thereby acquiring the optimum illumination.

Additionally, since how the shadow is generated by the louver film 9 does not depend on the size of the surface light source 10, the extensive illumination with less unevenness, which provides an appropriate shadow, is enabled by increasing the size of the surface light source 10 even if the size of the sample 8 is large.

[First Modification]

Figure 4:
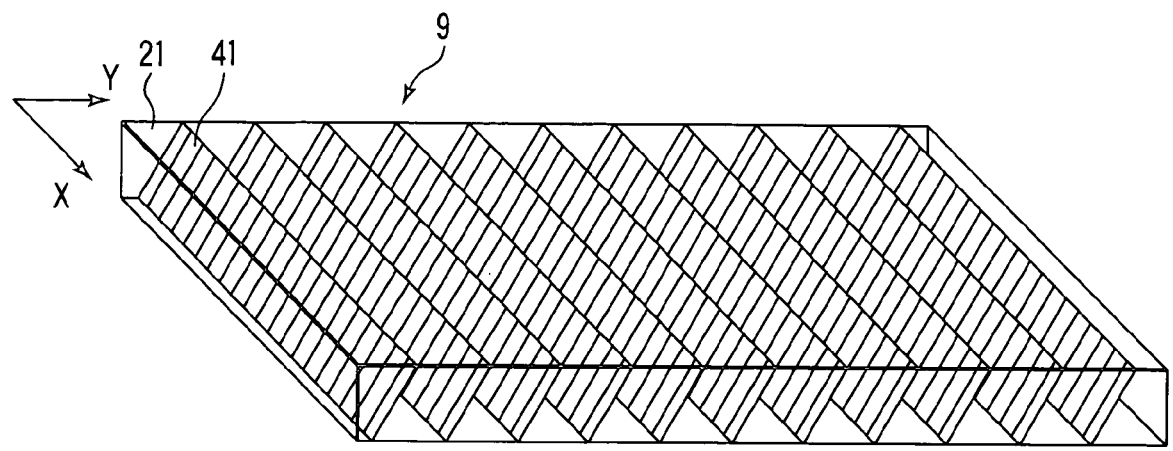
FIG. 4 is a perspective view schematically showing a configuration of a louver film in a first modification of the first embodiment according to the present invention.

Although the louver film 9 in which such micro louvers 22 as shown in FIG. 2 are upright is used in the above embodiment, it is also possible to employ a louver film 9 in which micro louvers 41 are inclined at a fixed angle from the vertical direction as shown in FIG. 4. That is, in this modification, the micro louvers 41 of the louver film 9 are inclined with respect to the plane of the transparent resin 21.

Figure 5:
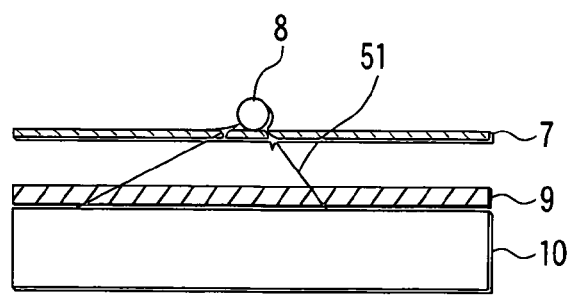
FIG. 5 schematically showing a cross section in the Y direction of a transmission illumination apparatus comprising the louver film depicted in FIG. 4.

FIG. 5 schematically shows a cross section in the Y direction of a transmission illumination apparatus according to this modification comprising the louver film depicted in FIG. 4. As shown in FIG. 5, it is possible to perform an oblique illumination method by which illumination light is obliquely applied to the sample 8 so that the shadow is further emphasized.

As a conventional general oblique illumination method, there is known a manner that deflects a mirror arranged in an illumination optical system or a manner that inserts a slit in an illumination optical path. If the mirror or the slit is arranged in the vicinity of a position that is conjugate with respect to a pupil of an observation optical system, there is no unevenness in brightness in a visual field, and the effect of the oblique illumination can be obtained. However, in a microscope provided with a variable power device, since a conjugate position with respect to the pupil of the observation optical system largely moves with a change in magnifying power, it is impossible to obtain the even oblique illumination in all working states.

According to this modification, in addition to the advantages of the present embodiment, the oblique illumination that provides the shadow with a higher intensity can be performed in the state with no unevenness.

[Second Modification]

Although the light orientation member 9 comprises a louver film and diffusion of illumination light is restricted in the Y direction only in the above-described embodiment, the light orientation member 9 may comprise overlapped louver films in order to provide an appropriate shadow also in the X direction.

As described above, in the binocular stereoscopic microscope, it is preferable that no shadow is generated in the right-and-left direction (the X direction) of images. Therefore, when the microscope is a binocular stereoscopic microscope, it is good enough for the light orientation member 9 constituted by overlapping louver films to restrict diffusion of illumination light in relation to the Y direction perpendicular to the plane that contains the two optical axes of the binocular stereoscopic microscope more than diffusion of illumination light in relation to the X direction parallel to the plane that contains the two optical axes of the binocular stereoscopic microscope.

FIG. 6A schematically shows a cross section in the Y direction of a transmission illumination apparatus according to this modification, and FIG. 6B schematically shows a cross section in the X direction of the transmission illumination apparatus according to this modification. Further, FIG. 7A is a plan view of an upper louver film 9b unit depicted in FIGS. 6A and 6B, FIG. 7B is a plan view of a lower louver film 9a unit depicted in FIGS. 6A and 6B, and FIG. 7C shows a state in which the louver film 9b depicted in FIG. 7A and the louver film 9a illustrated in FIG. 7B are overlapped.

As shown in FIGS. 6A and 6B, the light orientation member 9 comprises two louver films 9a and 9b. As shown in FIGS. 7A to 7C, one louver film 9a has micro louvers parallel to the plane that contains the two optical axes of the binocular stereoscopic microscope (i.e., the. X direction), the other louver film 9b has micro louvers perpendicular to the plane that contains the two optical axes of the binocular stereoscopic microscope, and each interval between the micro louvers parallel to the plane that contains the two optical axes of the binocular stereoscopic microscope (i.e., the X direction) is narrower than each interval between the micro louvers perpendicular to the plane that contains the two optical axes of the binocular stereoscopic microscope.

As shown in FIG. 6A, diffusion of illumination light concerning the Y direction is restricted by the louver film 9a only, and it is not affected by the louver film 9b. On the other hand, as shown in FIG. 6B, diffusion of illumination light concerning the X direction is not affected by the louver film 9a, and it is restricted by the louver film 9b only. As a result, an incidence angle of the illumination light in the direction perpendicular to the plane that contains the two optical axes of the binocular stereoscopic microscope (i.e., the Y direction) is smaller than an incidence angle of the illumination light in the direction parallel to the plane that contains the two optical axes of the binocular stereoscopic microscope (i.e., the X direction).

In this modification, since the control over the shadow in the X direction as well as the control over the shadow in the Y direction is enabled, the optimum illumination is possible with respect to various kinds of samples 8 in accordance with purposes.

[Third Modification]

Figure 8:
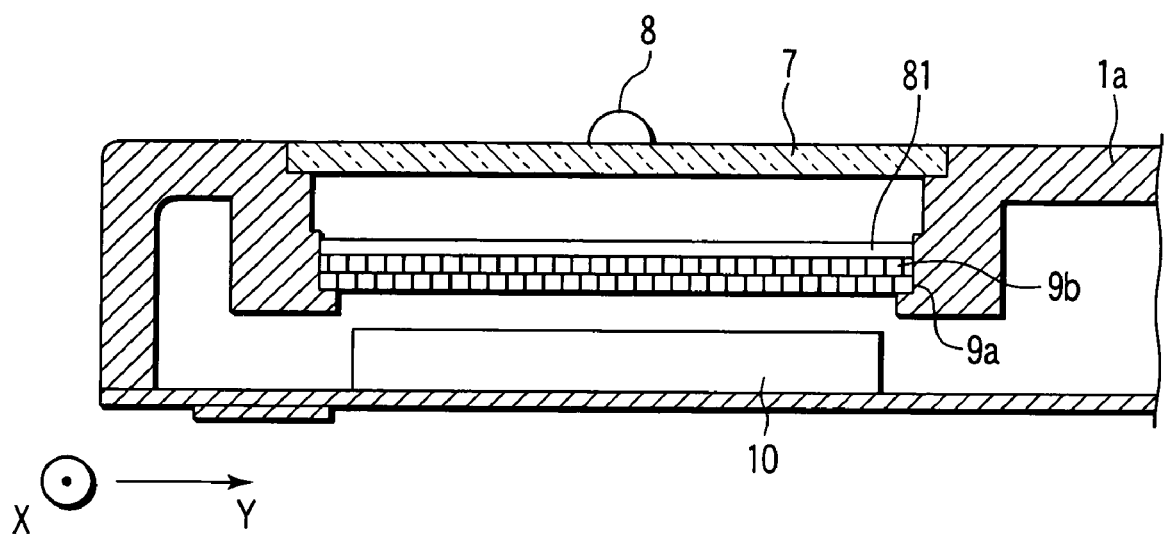
FIG. 8 schematically shows a cross section in the X direction of a transmission illumination apparatus in a third modification of the first embodiment according to the present invention.

FIG. 8 schematically shows a cross section in the X direction of a transmission illumination apparatus according to this modification. FIG. 9A is a plan view of an upper louver film 9b unit depicted in FIG. 8, FIG. 9B is a plan view of a lower louver film 9a unit depicted in FIG. 8, FIG. 9C shows a state in which the louver film 9b depicted in FIG. 9A and the louver film 9a depicted in FIG. 9B are overlapped, and FIG. 9D shows a state in which the louver film 9b depicted in FIG. 9A and the louver film 9a depicted in FIG. 9B are overlapped at a different slant with respect to the X direction.

As shown in FIG. 8, the light orientation member 9 according to this modification comprises the two overlapped louver films 9a and 9b like the second modification. However, as different from the second modification, the two louver films 9a and 9b are both arranged with their micro louvers inclined with respect to the plane that contains the two optical axes of the binocular stereoscopic microscope (i.e., the X direction) as shown in FIGS. 9A and 9B. As a result, a combined pattern of the micro louvers of the two louver films 9a and 9b becomes a pattern shown in FIG. 9C. Furthermore, the two louver films 9a and 9b both are allowed to rotate about an illumination optical axis vertical to the light emission surface of the surface light source 10, and the combined pattern of the micro louvers of the two louver films 9a and 9b can be changed to, e.g., a pattern shown in FIG. 9D by varying the two louver films 9a and 9b with respect to the X direction. That is, a level of the illumination light diffusion restriction, i.e., an incidence angle of illumination light can be changed in many ways. As a result, how the shadow is provided can be changed in many ways.

Moreover, in the transmission illumination apparatus according to this modification, a diffuser 81 is provided between the glass plate 7 and the light orientation member 9. The diffuser 81 diffuses illumination light to the extent that the diffusion restriction effect for the illumination light by the light orientation member 9 is not substantially affected. Provision of the diffuser 81 can make moire fringes invisible, the moire fringes being generated by superimposition of the two louver films 9a and 9b. Additionally, a line of the louver can be made invisible even if the distance between the light orientation member 9 and the sample 8 is small. As a result, a member having a particularly fine pitch does not have to be used for the louver films 9a and 9b, and a degree of freedom of selection of the micro louvers can be improved.

Second Embodiment

Figure 10A:
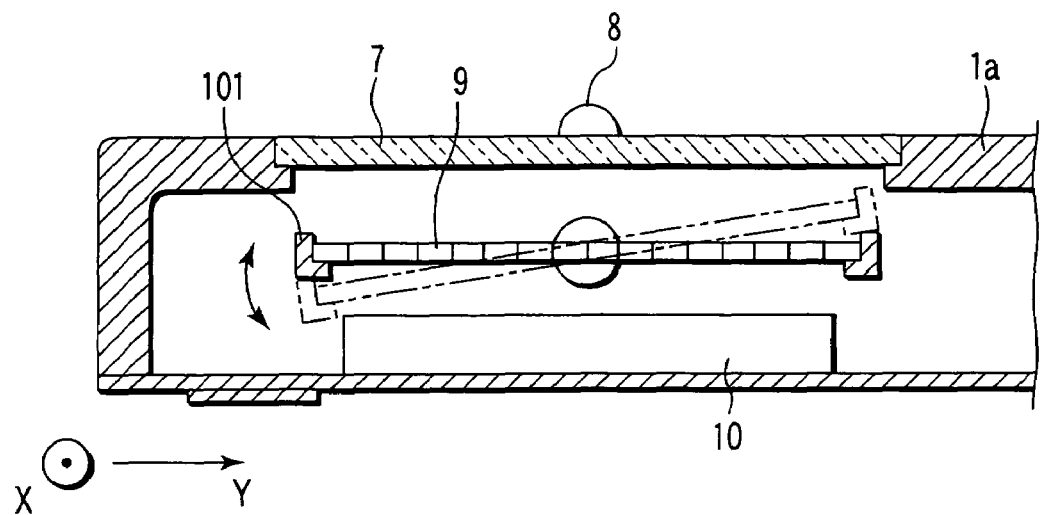
FIG. 10A schematically shows a cross section in the X direction of a primary part of a transmission illumination apparatus according to a second embodiment of the present invention.
Figure 10B:
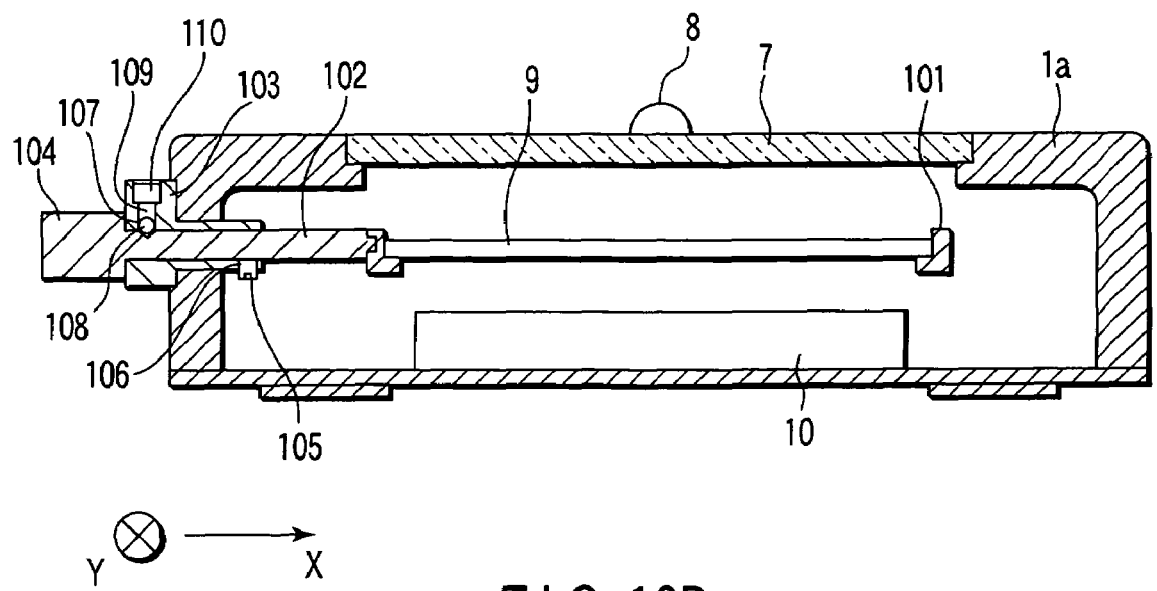
FIG. 10B schematically shows a cross section in the Y direction of the primary part of the transmission illumination apparatus according to the second embodiment of the present invention.

FIG. 10A schematically shows a cross section in the Y direction of a primary part of a transmission illumination apparatus according to a second embodiment of the present invention. FIG. 10B schematically shows a cross section in the X direction of the primary part of the transmission illumination apparatus according to the second embodiment of the present invention. In FIGS. 10A and 10B, members denoted by the same reference numerals as those of the members depicted in FIG. 1 are like members, thereby eliminating their detailed explanation.

The transmission illumination apparatus according to this embodiment further comprises a rotation mechanism that rotates the light orientation member 9 about an axis perpendicular to an illumination optical axis vertical to the light emission surface of the surface light source 10. This rotation mechanism roughly has a frame 101 that holds the light orientation member 9, a shaft 102 fixed to the frame 101, a bearing 103 that rotatably holds the shaft 102, and an operation knob portion 104 provided at an end portion of the shaft 102, as shown in FIGS. 10A and 10B.

In this embodiment, as shown in FIG. 2, the light orientation member 9 comprises a louver film having the micro louvers perpendicular to the parallel planes of the transparent resin. The louver film 9 is held in the frame 101. The frame 101 is fixed at the end portion of the shaft 102. The shaft 102 is rotatably held by the bearing 103. The other end portion of the shaft 102 is provided with the operation knob portion 104. A screw 105 is screwed in the shaft 102. The screw 105 cooperates with a groove 106 provided to the bearing 103, and serves to restrict a rotation quantity and prevent falling off. A hole 107 is formed to the bearing 103, and a ball 108, a spring 109 and a machine screw 110 are inserted in the hole 107. The ball 108 is pressed against the shaft 102 by a force of the spring 109 and enables the rotation of the shaft 102 to stop at an arbitrary angle.

An effect of the transmission illumination apparatus having such a configuration according to this embodiment will now be described.

Figure 11A:
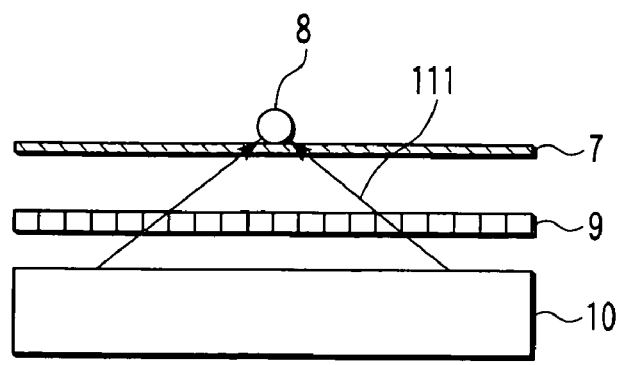
FIG. 11A schematically shows a cross section in the Y direction in a state where the louver film is parallel to a glass plate in the transmission illumination apparatus depicted in FIGS. 10A and 10B.
Figure 11B:
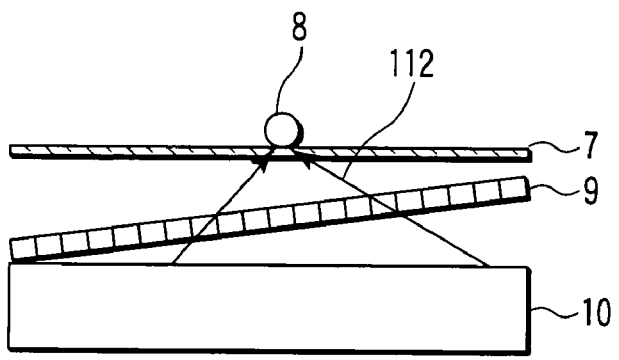
FIG. 11B schematically shows a cross section in the Y direction in a state where the louver film is inclined with respect to the glass plate at the maximum in the transmission illumination apparatus depicted in FIGS. 10A and 10B.

FIG. 11A schematically shows a cross section in the Y direction in a state where the louver film is parallel to the glass plate in the transmission illumination layer according to this embodiment, and FIG. 11B schematically shows a cross section in the Y direction in a state where the louver film is inclined with respect to the glass plate at the maximum in the transmission illumination apparatus in this embodiment.

As shown in FIG. 11A, in a state where the light orientation member, i.e., the louver film 9 is parallel to the glass plate 7, illumination light 111 projected from the surface light source 10 is appropriately restricted in relation to diffusion by the louver film 9 and applied to on the sample 8. As a result, an appropriate shadow can be provided to observation images of the sample 8, thereby enabling observation. The louver film 9 can be inclined with respect to the glass plate 7 by operating and rotating the operation knob portion 104.

As shown in FIG. 11B, in a state where the louver film 9 is inclined at the maximum, it is possible to perform oblique illumination by which illumination light is obliquely applied to the sample 8 and the shade is emphasized more than the state shown in FIG. 11A. The louver film 9 can be held at an arbitrary slant between the state shown in FIG. 11A and the state shown in FIG. 11B by operating the operation knob portion 104, thereby obtaining the effect of oblique illumination corresponding to this slant.

As described above, in this embodiment, an intensity of the shadow provided to the sample 8 can be continuously adjusted to an arbitrary quantity by the inclination adjustment of the louver film 9. As a result, the sample 8 can be observed with an appropriate shadow.

[Modification]

Although the light orientation member 9 comprises a louver film shown in FIG. 2 in the above-described embodiment, it may be constituted like the first to third modifications of the first embodiment. In this case, since the arbitrary shadow adjustment can be performed in accordance with a state of the sample 8 in addition to the respective advantages described in connection with the first modification to the third modification of the first embodiment, it is possible to cope with various kinds of sample 8.

Third Embodiment

Figure 12:
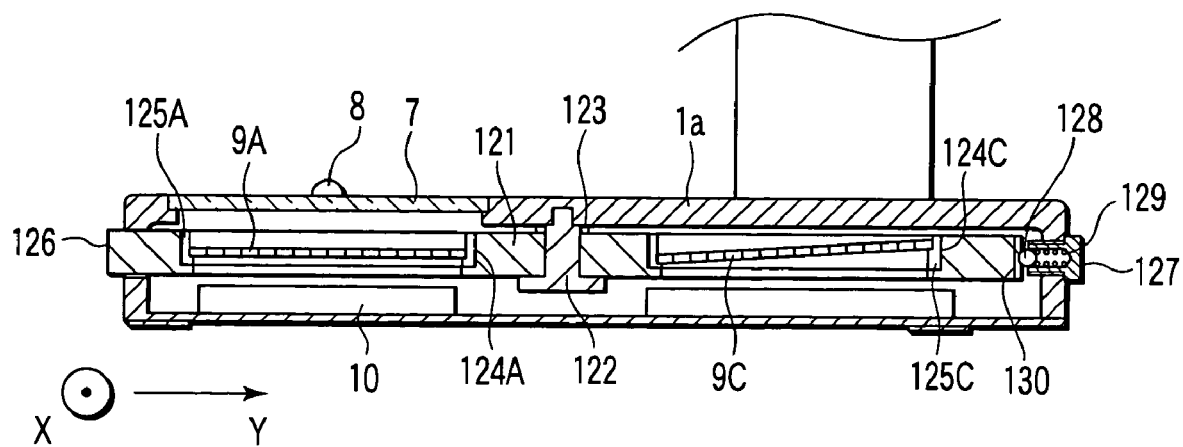
FIG. 12 schematically shows a cross section in the X direction of a primary part of a transmission illumination apparatus according to a third embodiment of the present invention.

FIG. 12 schematically shows a cross section in the X direction of a primary part of a transmission illumination apparatus according to a third embodiment of the present invention. FIG. 13 is a top view of a turret depicted in FIG. 12. In FIGS. 12 and 13, members denoted by the same reference numerals as those of the members shown in FIG. 1 are like members, thereby eliminating their detailed explanation.

In FIGS. 12 and 13, the transmission illumination apparatus according to this embodiment comprises four light orientation members 9A, 9B, 9C and 9D, and a switching mechanism that selectively arranges one of the four light orientation members 9A, 9B, 9C and 9D between the glass plate 7 and the surface light source 10. This switching mechanism includes a turret 121 that is rotatably supported with respect to the base portion 1a by a shaft 122. A spacer 123 that restricts the backlash at the time of rotation of the turret 121 is provided between the turret 121 and the base portion 1a. The turret 121 is provided with, e.g., four hole portions 124A, 124B, 124C and 124D. Frames 125A, 125B, 125C and 125D holding the light orientation members 9A, 9B, 9C and 9D are respectively placed deep inside and held in the hole portions 124A, 124B, 124C and 124D.

The turret 121 can be subjected to the rotation operation by manipulating an operation portion 126 protruding from the base portion 1a. The base portion 1a is provided with a plunger 127. The plunger 127 has a ball 128 and a spring 129 that are built therein, and the ball 128 is ppressed against an outer peripheral surface of the turret 121 by the spring 129. The turret 121 has a click groove 130 on the outer peripheral surface thereof, and rotation of the turret 121 is restricted when the ball 128 falls in the click groove 130. In a state where the ball 128 falls in the click groove 130, one of the four light orientation members 9A, 9B, 9C and 9D is appropriately arranged between the glass plate 7 and the surface light source 10. When an arbitrary force equal to or above a certain level is applied to the operation portion 126, since the ball 128 is pressed and moved by the inclined surface of the click groove 130, the turret 121 rotates. When another light orientation member reaches the position between the glass plate 7 and the surface light source 10, the ball 128 again falls in the click groove 130, and rotation of the turret 121 is restricted.

For example, each of the light orientation members 9A and 9C comprises a louver film shown in FIG. 2, and the louver film 9A is arranged in parallel to the glass plate 7 whilst the louver film 9C is arranged at a slant with respect to the glass plate 7 as shown in FIG. 12. In the state depicted in FIG. 12, since the louver film 9A is arranged between the glass plate 7 and the surface light source 10, an appropriate shadow can be provided to images of the sample 8, thereby enabling observation. When the turret 121 is rotated by manipulating the operation portion 126 from this state and the louver film 9C is arranged between the glass plate 7 and the surface light source 10, oblique illumination is enabled by the louver film 9C, which is inclined with respect to the glass plate 7, and the shadow with a higher intensity can be provided to images of the sample 8, thus enabling observation.

Although not shown, the light orientation members 9B and 9D may comprise the same louver film as that of the light orientation members 9A and 9C and may be obliquely arranged with respect to the glass plate 7 at an angle different from that of the louver film 9C. By doing so, different oblique illumination can be performed by using each of the louver films 9B and 9C, and observation is enabled with the shadows having different intensities being provided to images of the sample 8.

Further, the light orientation members 9A, 9B, 9C and 9D do not have to be arranged in all of the hole portions 124A, 124B, 124C and 124D, and appropriate hole portions may be used as vacant holes. By doing so, observation without shadows by the louver film 9 can be switched to/from observation with shadows by the louver film 9.

The light orientation members 9A, 9B, 9C and 9D may have the configuration mentioned herein as well as the same configurations as those of the first modification to the third modification of the first embodiment, respectively. With this arrangement, the louver films having various optical characteristics can be switched and utilized, more various kinds of illumination can be effected.

As described above, in this embodiment, since the light orientation members 9A, 9B, 9C and 9D having different optical characteristics can be switched and used, the optimum illumination can be performed with respect to various kinds of samples 8 in a transmission illumination apparatus.

Furthermore, since the respective light orientation members 9A, 9B, 9C and 9D are replaceable together with the frames 125A, 125B, 125C and 125D, it is possible to obtain observation images with arbitrary combinations of shadows in accordance with purposes.

Although the turret 121 is provided with the four hole portions 124A, 124B, 124C and 124D in this embodiment, the number of the hole portions can be arbitrarily increased by enlarging the turret 121, and the number of the hole portions can be also reduced.

Fourth Embodiment

Figure 14:
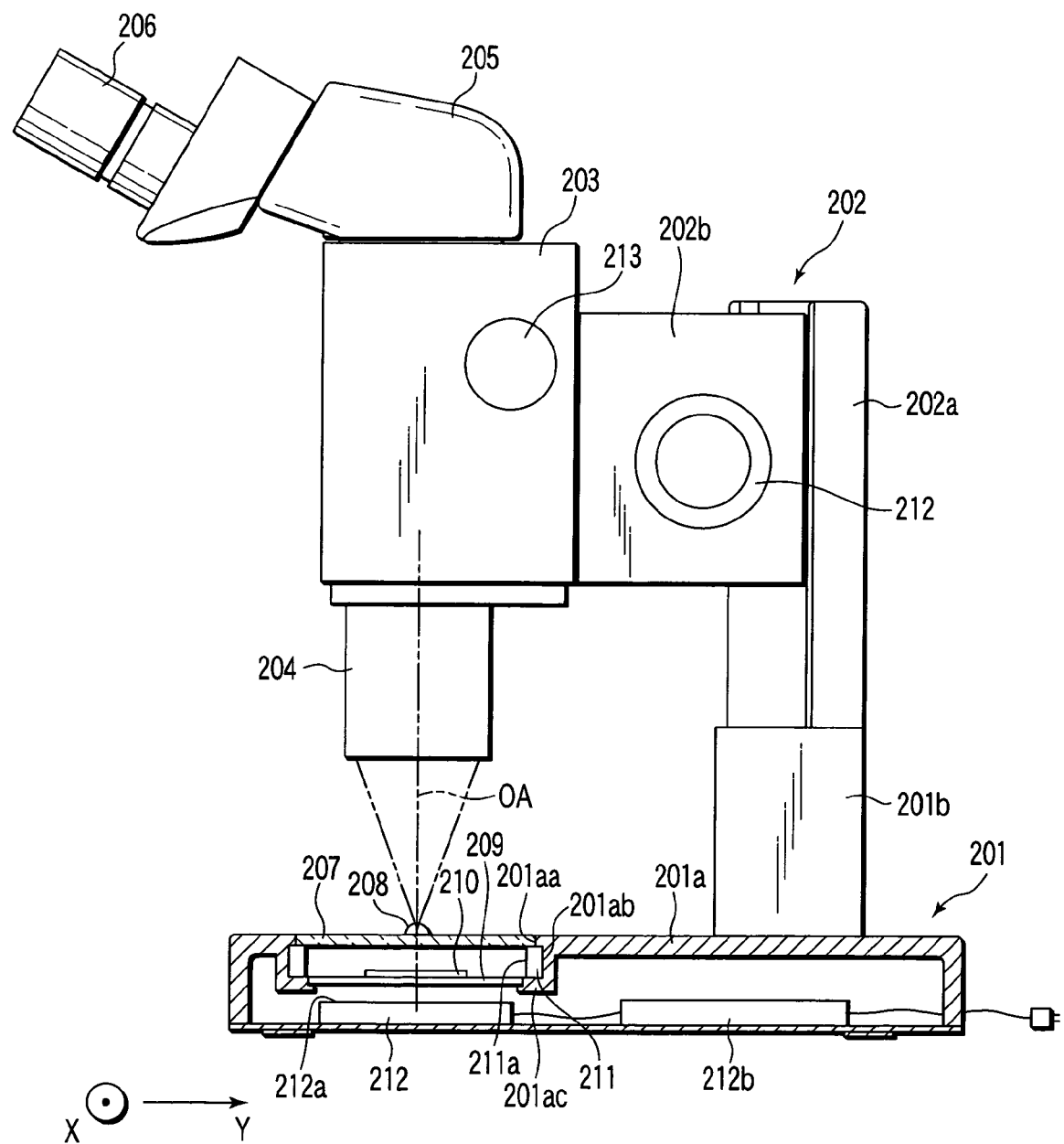
FIG. 14 is a schematic view showing a configuration of an illumination apparatus according to a fourth embodiment of the present invention.

An illumination apparatus according to a fourth embodiment of the present invention will be first described. FIG. 14 is a schematic view showing a schematic configuration of an illumination apparatus according to the fourth embodiment and a stereoscopic microscope having this illumination apparatus mounted therein. The stereoscopic microscope shown in FIG. 14 comprises a transmission illumination stand 201 as a microscope stand. The transmission illumination stand 201 comprises a base portion 201a that is horizontally arranged and a support column portion 201b provided upright on the base portion 201a. A sighting device 202 is inserted into and attached to the support column portion 201b, and moves up and down a movable portion 202b along a fixed portion 202a by a non-illustrated built-in sighting mechanism in accordance with an operation of a sighting handle 212 provided at a side surface portion of the movable portion 202b. A zoom mirror body 203 fixed to the movable portion 202b, an objective les 204 provided below the zoom mirror body 203, and a binocular tube 205 provided above the zoom mirror body 203, each of which includes a lens system, focus light from a sample 208 to form an image. The zoom mirror body 203 drives the inner lens system in accordance with an operation of a zoom handle 213 provided at the side surface portion, thereby changing an image formation magnification for an image of the sample 208. The binocular tube 205 comprises an eyepiece lens 206, and a microscopic examiner can observe the sample 208 through the eyepiece lens 206.

The base portion 201a has an opening portion 201aa at an upper surface portion facing the objective lens 204, and a glass plate 207 as a transparent sample mount plate on which the sample 208 is mounted is fitted in the opening portion 201aa. A surface light source 212, a light shielding plate 210 and a cylindrical mirror 211, which constitute the illumination apparatus according to the fourth embodiment, are arranged below the glass plate 207 in the base portion 201a. The discoid surface light source 212 is arranged on the inner surface of the bottom portion of the transmission illumination stand 201, and the discoid light shielding plate 210 is arranged at an upper surface portion of a transparent resin plate 209 supported by a support portion 201ac formed in the base portion 201a. The cylindrical mirror 211 having a cylindrical shape is fitted in a cylindrical hole portion 201ab in the base portion 201a. Assuming that a normal line running through the center of a light projection surface 212a of the upper surface of the surface light source 212 is an optical axis OA, the surface light source 212 is arranged in such a manner that the optical axis OA is matched with an optical axis as a central axis of the objective lens 204. Furthermore, the light shielding plate 210 is arranged in such a manner that a central line connecting the centers of the upper and lower surfaces is matched with the optical axis OA, and the cylindrical mirror 211 is arranged in such a manner that a central axis parallel to the cylindrical surface is matched with the optical axis OA. In this manner, the surface light source 212, the light shielding plate 210 and the cylindrical mirror 211 are arranged to form concentric circles with the optical axis OA at the center as seen from the upper side of the glass plate 207 as shown in FIG. 15. Here, FIG. 15 is a plan view showing the surface light source 212, the light shielding plate 210, the cylindrical mirror 211 and the resin plate 209.

It is to be noted that each drawing to which reference is made shows XY coordinate axes that are set with respect to the illumination apparatus or the like according to the present invention for the convenience's sake. For example, as shown in FIG. 14, in the illumination apparatus and the stereoscopic microscope according to the fourth embodiment, a direction vertical to the page space corresponding to the right-and-left direction of a microscopic examiner is determined as an X axis, and the right-and-left direction in the page space corresponding to the front-and-back direction of the microscopic examiner is determined as a Y axis.

The surface light source 212 is realized by using a fluorescent lamp, an LED or the like, receives a power from a power supply portion 212b connected with a commercial power source, and projects from each point on a light projection surface 212a a white light with the uniform brightness substantially symmetrically with the optical axis OA at the center. Incidentally, it is good enough for the surface light source 212 to project a white light with a projection angle in a predetermined range that is substantially rotation-symmetrical and oblique with respect to at least the optical axis OA. As such a surface light source 212, it is possible to use, e.g., a surface light source that projects light into a space between two circular cones with different apex angles that are arranged with their central axes being substantially parallel to the optical axis OA, wherein a point on the light projection surface 212a is determined as a common apex, but does not project light in substantially the same direction as the optical axis OA at each point on the light projection surface 212a. Moreover, for example, the surface light source 212 may project light that is oblique in one direction with respect to the optical axis OA and the surface light source 212 may be rotated about the optical axis OA. It is to be noted that the shape of the surface light source 212 is not restricted to a discoid shape, and it may be a hollow discoid shape, a rectangular tabular shape or the like. Additionally, light projected from the surface light source 212 is not restricted to a white light, and the surface light source 212 may project a chromatic light of, e.g., red, green or blue.

The light shielding plate 210, which is a plate that is formed of opaque material for light projected from the surface light source 212, shields a part of the light projected from the surface light source 212. In particular, the light shielding plate 210 shields light that is directly applied to the sample 8 from the surface light source 212, and also shields light that is transmitted through the glass plate 207 from the surface light source 212 and directly enters the objective lens 204. It is to be noted that the light shielding plate 210 is not restricted to the plate, and it may be a sheet, a film or the like. Further, the light shielding plate 210 does not have to be optically completely opaque, and it may transmit light from the surface light source 212 with a predetermined transmission factor like a concentration filter, and it may have a transmission factor distribution in a transmission surface thereof. It is to be noted that the shape of the upper and lower surfaces as light shielding surfaces of the light shielding plate 210 is not restricted to a circular shape, and it may be an arbitrary shape such as an elliptical shape or a rectangular shape in accordance with applications. That is, the light shielding plate 210 shield light different quantities in two directions perpendicular to each other in a plane vertical to the optical axis.

The cylindrical mirror 211, which is a reflection illumination member, reflects a part of light projected from the surface light source 212 by a reflection surface 211a formed on its inner surface to illuminate the sample 208. It is to be noted that the reflection surface 211a is not restricted to a cylindrical surface, and it may be, e.g., a frustum surface having a small apex angle slightly inclined with respect to the optical axis OA. Furthermore, the reflection surface 211a is not restricted to the uniform curved surface, and it may be a surface entirely subjected to patterned indentation processing so that a reflected light can be diverged, converged or diffused. It is to be noted that an outer shape of the cylindrical mirror 211 is not restricted to the cylindrical shape, and it may be an arbitrary shape such as a square column shape.

FIG. 16 is a cross-sectional view in the Y direction showing an illumination state with respect to the sample 208. As shown in FIG. 16, for example, of light projected from a point P1 on the light projection surface 212a, projected light IL1-1 and IL1-2 having large projection angles with the optical axis OA as a reference are reflected by the reflection surface 211a and illuminate the sample 208. Likewise, projected light in a range sandwiched by the projected light IL1-1 and IL1-2 also illuminate the sample 208. On the other hand, of light projected from the point P1, a projected light IL2 with a small projection angle projected to be directly applied to the sample 208 is shielded by the light shielding plate 210. In this manner, of the light projected from each point on the light projection surface 212a, the light projected with a large projection angle in a predetermined range is reflected by the reflection surface 211a and illuminates the sample 208 as illumination light, and the light projected with a small projection angle to be directly applied to the sample 208 is shielded by the light shielding plate 210. Although FIG. 16 shows this state in the cross section along the Y direction, but this state is actually generated rotation-symmetrically with the optical axis OA as a central axis.

Here, as the projected light IL1-1 and IL1-2 are exemplified, in the illumination apparatus according to the fourth embodiment, the illumination light that illuminates the sample 208 is used to illuminate the sample 208 with a larger incidence angle than an angle corresponding to a numerical aperture of the objective lens 204, which receives light from the sample 208. As a result, this illumination apparatus can perform dark field illumination by which illumination is performed with an oblique light that does not directly enter the objective lens 204, and provide the shadow to the transparent sample 208. In this case, the objective lens 204 receives a scattered light and a diffracted light alone generated in the sample 208 as light that is used to observe the sample 208. However, in this illumination apparatus, reflected light that is indicated as projected light IL3 in FIG. 6 directly illuminates the sample 208, the illumination efficiency is good. In order to obtain brighter illumination, it is desirable that a size of the light projection surface 212a is larger than that of the light shielding plate 210.

Incidentally, in such a binocular stereoscopic microscope as shown in FIG. 14, since images of the sample 208 are generally independently formed for a right eye and a left eye by optical axes aligned in the X direction, when the shadow is provided in the X direction of the sample 208, the images of the sample 208 observed by the right and left eyes have different shadows, thereby making it difficult to observe the sample. In order to avoid this problem, it is preferable to prevent the shadow with a high intensity from being generated in the X direction, and it is good enough to form the light shielding surface of the light shielding plate into an elliptic shape. As a result, a short axis of the ellipse is parallel to the X direction and light from the surface light source 212 is directly applied to the sample 208 to some extent so that the shadow generated in the X direction of the sample 208 can be weakened. Moreover, for example, the shadow generated in the X direction of the sample 208 can be weakened by using a concentration filter as the light shielding plate 210, providing a transmission factor distribution at least in the X direction in the light shielding surface and increasing a light quantity with an increased high transmission factor of light that directly illuminates the sample 208 from the X direction. It is to be noted that these light shielding plates 210 may be arbitrarily rotatable about the optical axis OA so that the shadow generated to the sample 208 can be changed about the optical axis OA.

In the illumination apparatus according to the fourth embodiment mentioned above, of the light projected from the surface light source 212, the light projected with a large projection angle in a predetermined range is reflected by the reflection surface 211a to illuminate the sample 208, and the light projected with a small projection angle to be directly applied to the sample 208 is shielded by the light shielding plate 210. Therefore, dark field illumination can be performed with respect to the sample 208 with the simple configuration, and the shadow can be provided to the transparent sample 208. Additionally, the shadow in the X direction can be alleviated by forming the light shielding surface of the light shielding plate 210 into an elliptical shape or providing a transmission factor distribution while using a concentration filter as the light shielding plate 210. Further, the shadow can be changed about the optical axis OA in many ways by rotating these light shielding plates 210.

Fifth Embodiment

A fifth embodiment according to the present invention will now be described. Although the light projected from the surface light source 212 with a small projection angle to be directly applied to the sample 208 is shielded by the light shielding plate 210 in the fourth embodiment described above, a light orientation member is used in place of the light shielding plate 210 and light that is directly applied to the sample 208 is shielded in the fifth embodiment.

FIG. 17 is a schematic view showing a configuration of an illumination apparatus and a part of a configuration of a stereoscopic microscope according to the fifth embodiment of the present invention. As shown in FIG. 17, the illumination apparatus according to the fifth embodiment comprises a light orientation member 213 in place of the light shielding plate 210 and the resin plate 209 provided in the illumination apparatus according to the fourth embodiment. Any other configurations are the same as the fourth embodiment, and like reference numerals denote like constituent parts.

Figure 18A:
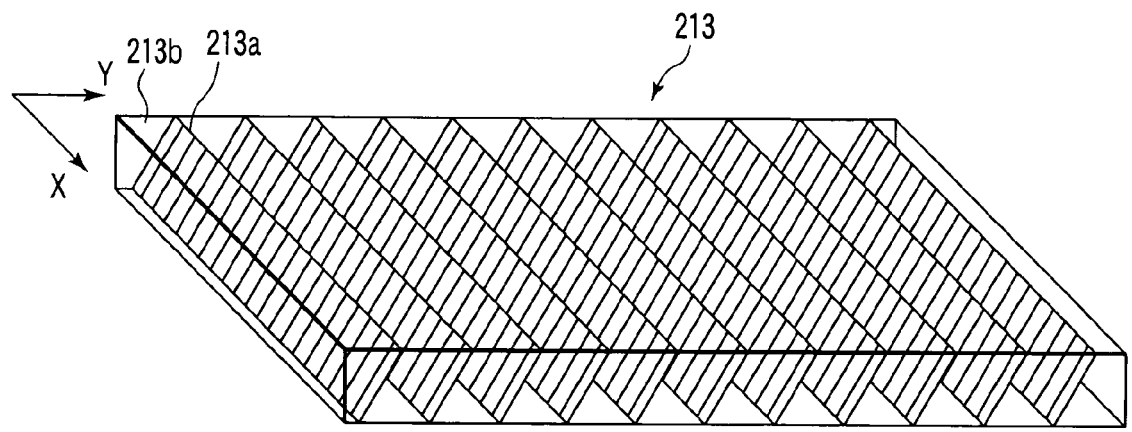
FIG. 18A is a perspective view showing a partial configuration of a light orientation member depicted in FIG. 17.

The light orientation member 213 is realized by a louver film. FIG. 18A is a perspective view schematically showing a part of a configuration of the louver film, which is the light orientation member 213. As shown in FIG. 18A, the light orientation member 213 is formed of strip-like opaque members 213a arranged in a louver shape and a transparent holding member 213b that holds the opaque members 213a. The opaque members 213a are opaque with respect to light projected from the surface light source 212, and the transparent holding member 213b is transparent with respect to this light. The opaque members 213a are entirely inclined with respect to upper and lower surfaces of the tabular transparent holding member 213b.

Figure 18B:
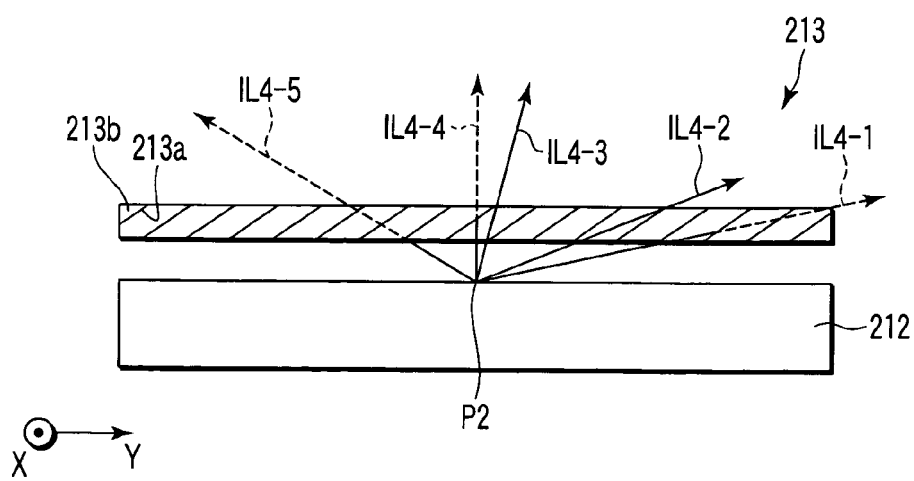
FIG. 18B is a cross-sectional view illustrating a state of a transmitted light of the light orientation member depicted in FIG. 17.

FIG. 18B is a cross-sectional view schematically showing a state of illumination light when the light orientation member 213 is illuminated by using the surface light source 212. As shown in FIG. 18B, in the Y-direction cross section perpendicular to the longitudinal direction of the opaque members 213a, of light projected from a point P2 on the light projection surface 212, projected light IL4-2 and IL4-3 passing through each gap between the respective opaque members 213a are transmitted through the light orientation member 213, and projected light IL4-4 and IL4-5 crossing the opaque members 213a are shielded by the light orientation member 213. Here, the projected light IL4-2 is a projected light having the largest projection angle in the projected light that can be transmitted through the light orientation member 213, and the projected light IL4-3 is a projected light having the smallest projection angle. On the other hand, all the projected light projected from the light projection surface 212a are transmitted through the light orientation member 213 in a cross section parallel to the longitudinal direction of each opaque member 213a and substantially parallel to the surface of each opaque member 213a, and an arbitrary projected light projected from the light projection surface 212a is shielded by the light orientation member 213 in a cross section crossing the surface of each opaque member 213a. That is, of the light projected from the point P2 on the light projection surface 212a, the projected light that includes each of the projected light IL4-2 and IL4-3 and is projected into a space sandwiched between two planes parallel to the X axis is transmitted through the light orientation member 213, and any other projected light is shielded by the light orientation member 213. Here, the projection angles of the projected light IL4-2 and IL4-3 can be adjusted by changing at least one of each gap between the respective opaque members 213a and the inclination angle of these members 213a. For example, the projected light IL4-3 that vertically enters the light orientation member 213 can be transmitted by increasing each gap between the respective opaque members 213a.

In the illumination apparatus according to the fifth embodiment, the light orientation member 213 is entirely formed into a circular shape, and the opaque members 213a are concentrically formed with the center of a discoid as a reference. FIG. 19 is a plan view showing the cylindrical mirror 211 and the light orientation member 213. As shown in FIG. 19, the light orientation member 213 is arranged so that the optical axis OA runs through the center of the concentric circles of the opaque members 213a. Furthermore, as shown in FIG. 17, each opaque member 213a is rotation-symmetrically inclined with respect to the optical axis OA so that an inward normal line forms an elevation angle. That is, the light orientation member 213 has opaque members 213a having similar hollow truncated circular cone shapes whose bottom circles are concentrically arranged.

FIG. 20 is a cross section in the Y direction showing an illumination state with respect to the sample 208. As shown in FIG. 20, for example, of light projected from a point P1 on the light projection surface 212, projected light IL1-1 and IL1-2 having large projection angles are reflected by the reflection surface 211a to illuminate the sample 208 and, likewise, projected light in a range sandwiched between the projected light IL1-1 and IL1-2 also illuminate the sample 208. On the other hand, of light projected from the point P1, a projected light IL2 with a small projection angle projected to be directly applied to the sample 208 is shielded by the light orientation member 213. In this manner, of the light projected from each point on the light projection surface 212a, the light projected with a large projection angle in a predetermined range is reflected by the reflection surface 211a to illuminate the sample 208 as illumination light, whilst the light projected with a small projection angle projected to be directly applied to the sample 208 is shielded by the light orientation member 213. Although FIG. 20 shows this state in the cross section along the Y direction, this state is actually generated rotation-symmetrically with the optical axis OA as a central axis.

In the illumination apparatus according to the fifth embodiment, like the illumination apparatus described in conjunction with the fourth embodiment, illumination light that illuminates the sample 208 illuminates the sample 208 with an incidence angle larger than an angle corresponding to a numerical aperture of the objective lens 204. As a result, in this illumination apparatus, dark field illumination can be likewise performed with respect to the sample 208, and the shadow can be provided to the transparent sample 208. Further, in this illumination apparatus, since the projected light IL3 that directly enters the objective lens 204 in the illumination apparatus described in conjunction with the fourth embodiment can be shielded by the light orientation member 213, thereby realizing perfect dark field illumination.

It is to be noted that, in order to prevent the shadow with a high intensity from being generated in the X direction of the sample 208, each gap between the respective opaque members 213a in the X direction may be increased so that an angle range in which illumination light falls on the sample 208 can be increased, and that the gap may be further increased so that the light from the surface light source 212 can be directly applied to the sample 208 to some extent, for example. Moreover, the light orientation member 213 having such a configuration may be arbitrarily rotatable about the optical axis OA so that the shadow generated to the sample 208 can be changed about the optical axis OA.

Additionally, as shown in FIG. 21, a light orientation member 213' in which each gap between respective opaque members 213a is increased may be used so that a light quantity of illumination light with respect to the sample 208 can be increased. In this case, since light having a small projection angle from the surface light source 212 is transmitted through each gap between the respective opaque members 213a to directly illuminate the sample 208, it is desirable to arrange the light shielding plate 210 on the upper surface portion of the light orientation member 213' in order to shield the light used for direct illumination.

Figure 23:
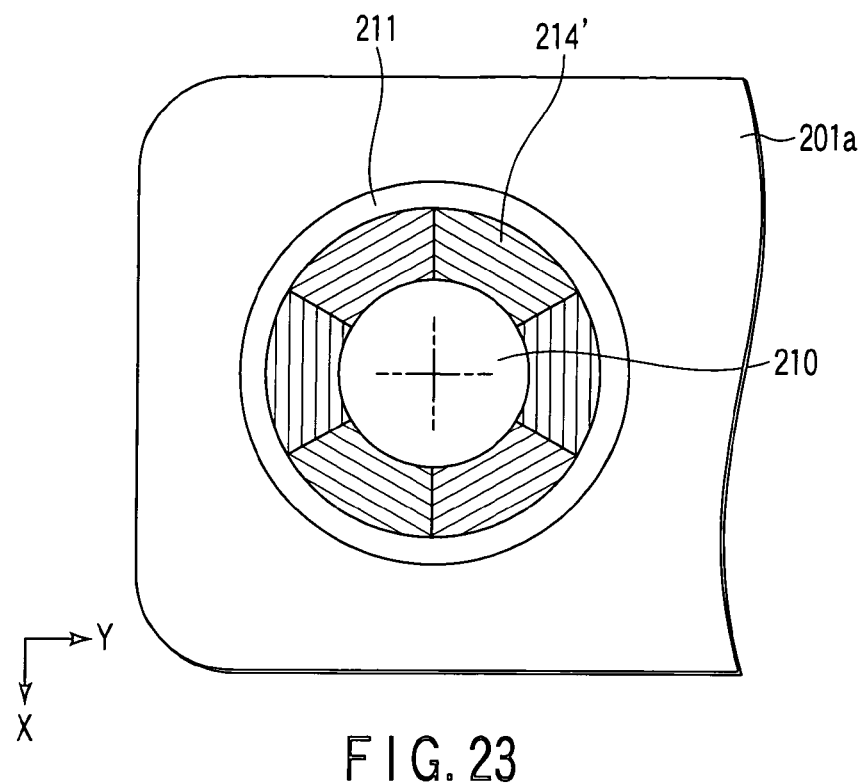
FIG. 23 is a plan view showing a configuration of the illumination apparatus depicted in FIG. 21.

Further, for example, as shown in FIG. 22, a light orientation member 214 having opaque members 214a that have similar hexagonal shapes having different sizes in an XY plane and are arranged with their gravity points being coincided with each other may be used in place of the light orientation member 213 having the opaque members 213a that are concentrically arranged. In this case, the light orientation member 214 having a discoid shape as a whole may be formed by bonding side surfaces of the light orientation members 214-1 to 214-6 each corresponding to each side of the hexagon and having a fan plate shape. Here, each opaque member 214 formed into a hexagonal shape is inclined with respect to the optical axis OA in such a manner that inner normal lines form equal elevation angles. That is, the light orientation member 214 has the opaque members 214 having similar truncated pyramid shapes in which polygons of the bottom surfaces are arranged with their gravity points being overlapped. Furthermore, each gap between the respective opaque members 214a is reduced in size so that light having a small projection angle that directly illuminates the sample 208 is not generated from the surface light source 212. By using such a light orientation member 214, dark field illumination can be performed with respect to the sample 208 and the shadow can be provided to the transparent sample 208 like the light orientation member 213. Incidentally, when the light orientation member 214' in which each gap between the respective opaque members 214a is increased is used to increase a light quantity of illumination light with respect to the sample 208, it is good enough to arrange the light shielding plate 210 on the upper surface portion of the light orientation member 214' so that the light that directly illuminates the sample 208 can be shielded, as shown in FIG. 23. Moreover, although the arrangement shape of the opaque members in the XY plane is the hexagonal shape in the light orientation members 214 and 214', the present invention is not restricted thereto, and any arbitrary polygonal shape can be used.

In the illumination apparatus according to the fifth embodiment described above, of the light projected from the surface light source 212, the light projected with a large projection angle in a predetermined range is reflected by the reflection surface 211a so that the sample 208 is illuminated with this light, and the light projected with a small projection angle that directly illuminates the sample 208 is shielded by the light orientation members 213 and 214, and hence dark field illumination can be effected for the sample 208 by using the simple structure, and the shadow can be provided to the transparent sample 208. Additionally, in this illumination apparatus, since the light that directly enters the objective lens 204 from the surface light source 212 is shielded by the light orientation member 213, perfect dark field illumination can be realized. Further, when each arrangement gap of the opaque members 213a and 214a is increased so that a light quantity of illumination light with respect to the sample 208 is increased, dark field illumination can be carried out by further providing the light shielding plate 210 on the upper surface portions of the light orientation members 213 and 214.

Sixth Embodiment

A sixth embodiment according to the present invention will now be described. Although the light orientation member 213 in which the opaque members 213a are rotation-symmetrically arranged is used in order to perform dark field illumination with respect to all directions of the sample 208 in the fifth embodiment, a light orientation member in which opaque members are arranged in a louver form is used so that dark field illumination is effected with respect to a predetermined direction of the sample 208 and this direction can be arbitrarily changed in the sixth embodiment.

Figure 24:
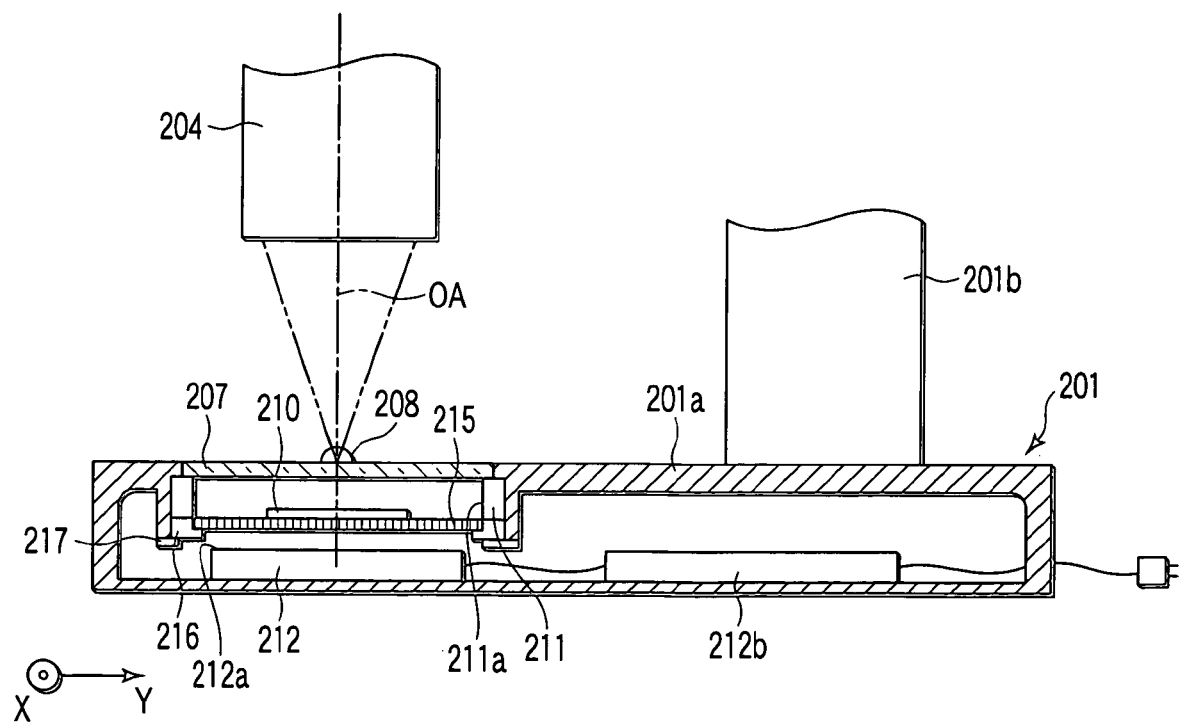
FIG. 24 is a schematic view showing a configuration of an illumination apparatus according to a sixth embodiment of the present invention.

FIG. 24 is a schematic view showing a configuration of an illumination apparatus and a partial configuration of a stereoscopic microscope according to the sixth embodiment of the present invention. As shown in FIG. 24, the illumination apparatus according to the sixth embodiment comprises a light orientation member 215 in place of the light orientation member 213 included in the illumination apparatus according to the fifth embodiment, and further comprises a light shielding plate 210 on an upper surface portion of the light orientation member 215. Additionally, this illumination apparatus newly comprise a rotation drive portion 216. The cylindrical rotation drive portion 216 is arranged in such a manner that it is fitted in an inner cylindrical hole portion 201ab of the base portion 201a, holds the light orientation member 215 in the cylinder thereof, and rotates the light orientation member 215 and the light shielding plate 210 about the optical axis OA in accordance with an operation by a microscopic examiner. It is to be noted that the rotation drive portion 216 is supported by a lid member 217 so that it does not fall off the hole portion 201ab. Any other configuration is the same as the fifth embodiment, and like reference numerals denote like constituent parts.

Figure 25:
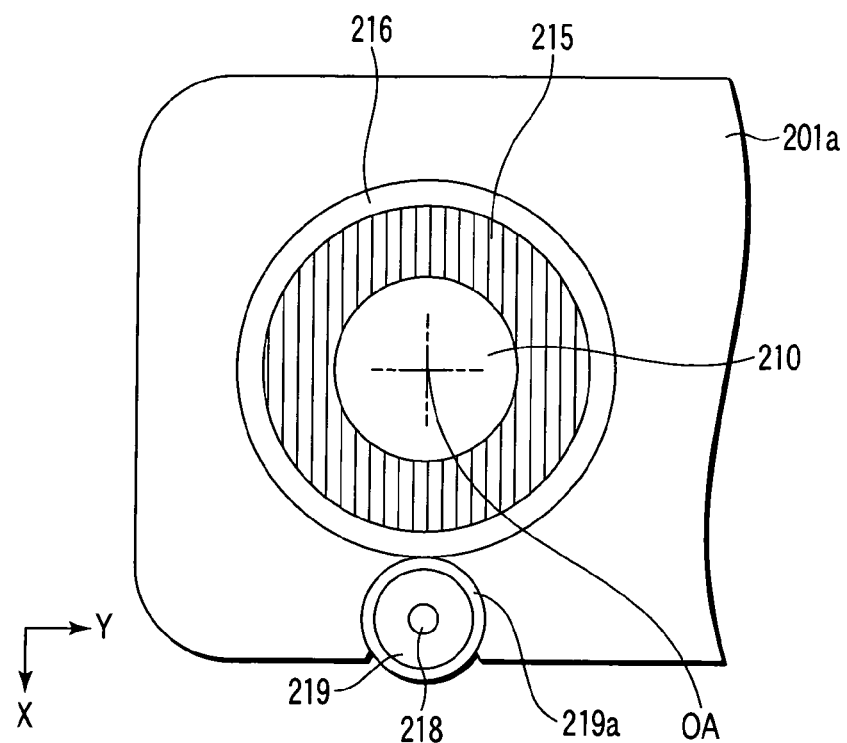
FIG. 25 is a plan view showing a configuration of the illumination apparatus depicted in FIG. 24.

FIG. 25 is a plan view showing the light orientation member 215, the light shielding plate 210, the rotation drive portion 216 and an operation mechanism that drives the rotation drive portion 216. As shown in FIG. 25, a rotary shaft 218 and a discoid rotation knob 219 capable of rotating about the rotary shaft 218 are provided at a position in the X direction from the optical axis OA at an upper surface end portion of the base portion 201a. Further, a gear 219a subjected to knurling processing is provided on an outer peripheral side surface of the rotation knob 219, and rotation of the gear 219a is transmitted to the rotation drive portion 216 when an outer peripheral side surface of the rotation drive portion 216, which is likewise subjected knurling processing, is brought into contact with the gear 219a and their knurled portions are meshed with each other. The rotation knob 219 and a part of the outer peripheral portion of the gear 219a protrude from the side surface portion of the base portion 201a, and a microscopic examiner can rotate the light orientation member 215 and the light shielding plate 210 together with the rotation drive portion 216 about the optical axis OA by rotating the protruding portions about the rotary shaft 218. It is to be noted that the rotation drive portion 216 is manually rotated by using the gear 219a in this embodiment, a drive mechanism such as a stepping motor, a voice coil motor, a piezoelectric element may be further provided in order to automatically drive the gear 219a, or the rotation drive portion 216 may be directly automatically driven.

Figure 26:
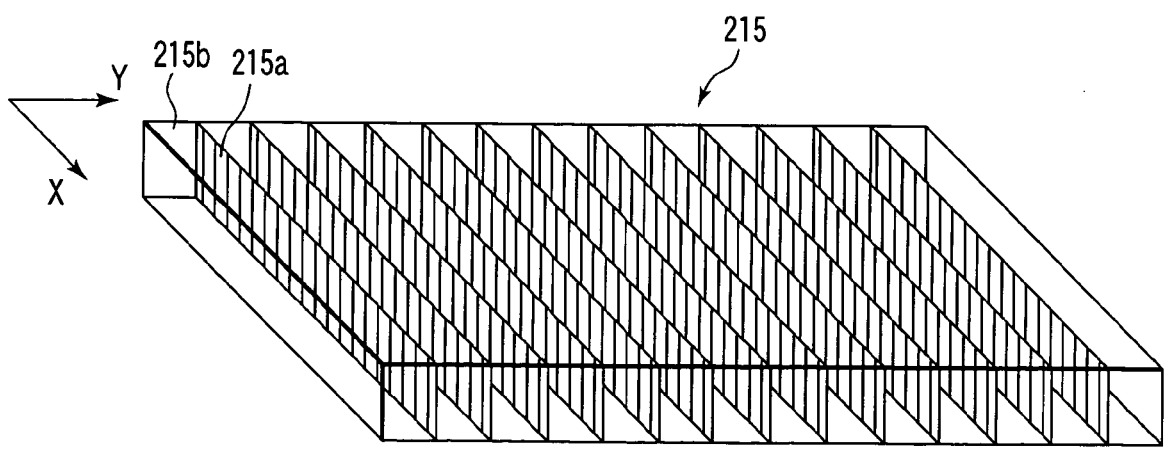
FIG. 26 is a perspective view showing a partial configuration of the light orientation member depicted in FIG. 24.

FIG. 26 is a perspective view schematically showing a partial configuration of a louver film as the light orientation member 215. As shown in FIG. 26, the light orientation member 215 comprises opaque members 215a arranged in a louver form and a transparent holding member 215b that holds the opaque members 215a. The opaque members 215a are entirely vertically arranged with respect to upper and lower surfaces of the tabular transparent holding member 215b. It is to be noted that the opaque members 215a are uniformly arranged on the entire surface in the light orientation member 215.

Figure 27A:
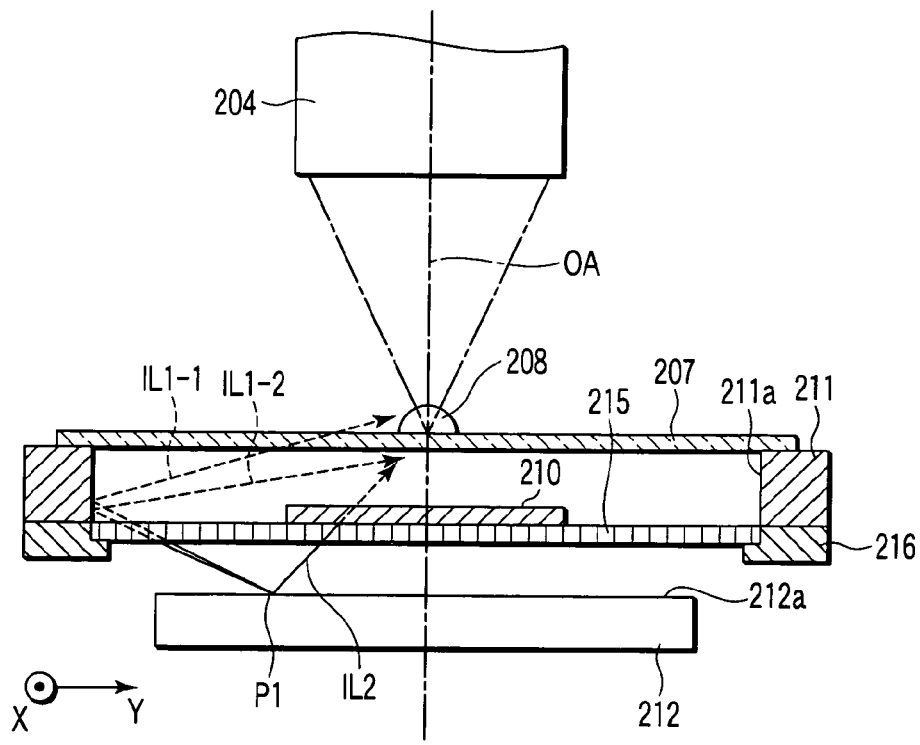
FIG. 27A is a cross-sectional view in the Y direction illustrating an illumination state by the illumination apparatus depicted in FIG. 24.
Figure 27B:
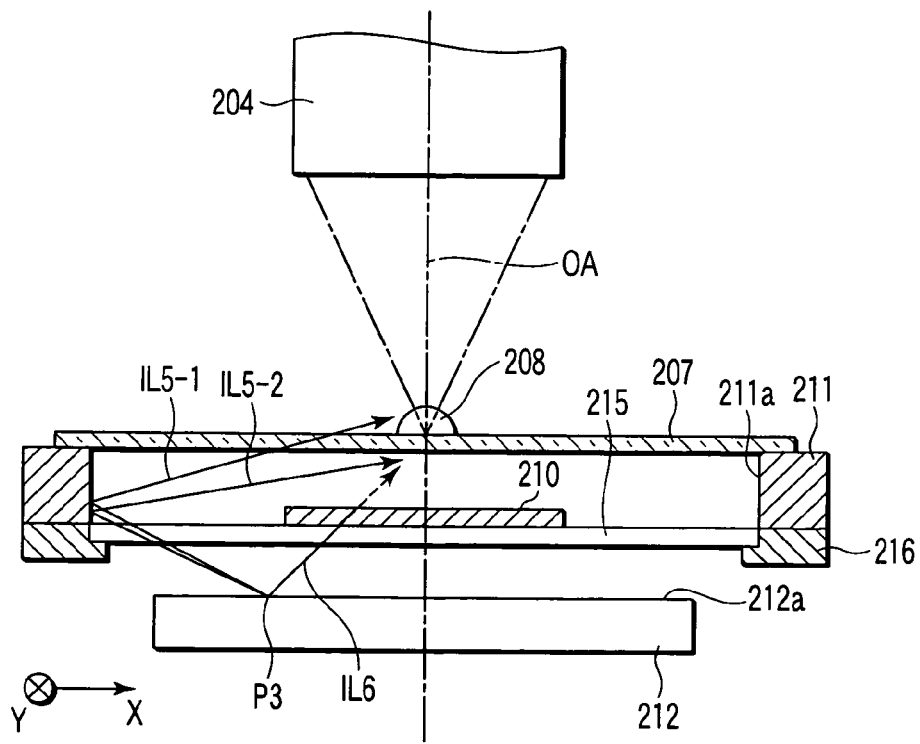
FIG. 27B is a cross-sectional view in the X direction illustrating an illumination state by the illumination apparatus depicted in FIG. 24.

FIGS. 27A and 27B are cross-sectional views showing illumination states with respect to the sample 208, and show a cross section in the Y direction and a cross section in the X direction in accordance with a state of the light orientation member 215 depicted in FIG. 25, respectively. As shown in FIG. 27A, in the cross section in the Y direction, for example, of light projected from a point P1 on the light projection surface 212a, projected light IL1-1 and IL1-2 having a large projection angle and a projected light in a range sandwiched between the projected light IL1-1 and IL1-2 are shielded by the light orientation member 215, and a projected light IL2 projected with a small projection angle that directly illuminates the sample 208 is shielded by the light shielding plate 210. On the other hand, as shown in FIG. 27B, in the cross section in the X direction, for example, of light projected from a point P3 on the light projection surface 212a, projected light IL5-1 and IL5-2 having a large projection angle and a projected light in a range sandwiched between the projected light IL5-1 and IL5-2 are reflected by the reflection surface 211a, and illuminates the sample 208. Furthermore, of the light projected from the point P3, a projected light IL6 having a small projection angle that directly illuminates the sample 208 is shielded by the light shielding plate 210. In this manner, of the light projected from each point on the light projection surface 212a, light projected with a large projection angle in a predetermined range is reflected by the reflection surface 211a in the cross section parallel to the opaque members 215a so that the sample 208 is illuminated with this light as an illuminated light, and shielded by the light orientation member 215 in the cross section crossing the opaque members 215a. Moreover, the light projected with a small projection angle that directly illuminates the sample 208 is shielded by the light shielding plate 210 in an arbitrary cross section.

In the illumination apparatus according to the sixth embodiment, like the illumination apparatuses described in conjunction with the fourth and fifth embodiments, the illumination light that is used to illuminate the sample 208 illuminates the sample 208 at an incidence angle larger than an angle corresponding to a numerical aperture of the objective lens 204. As a result, in this illumination apparatus, dark field illumination can be likewise performed with respect to the sample 208, and the shadow can be provided to the transparent sample 208. Additionally, in this illumination apparatus, dark field illumination can be effected in the cross section parallel to the opaque members 215a, but the sample 208 cannot be illuminated in the cross section crossing the opaque members 215a, thereby carrying out dark field illumination with respect to a predetermined direction of the sample 208 only. Further, since the light orientation member 215 can be rotated about the optical axis OA, a direction along which dark field illumination is carried out can be arbitrarily set with respect to the sample 208.

Figure 28A:
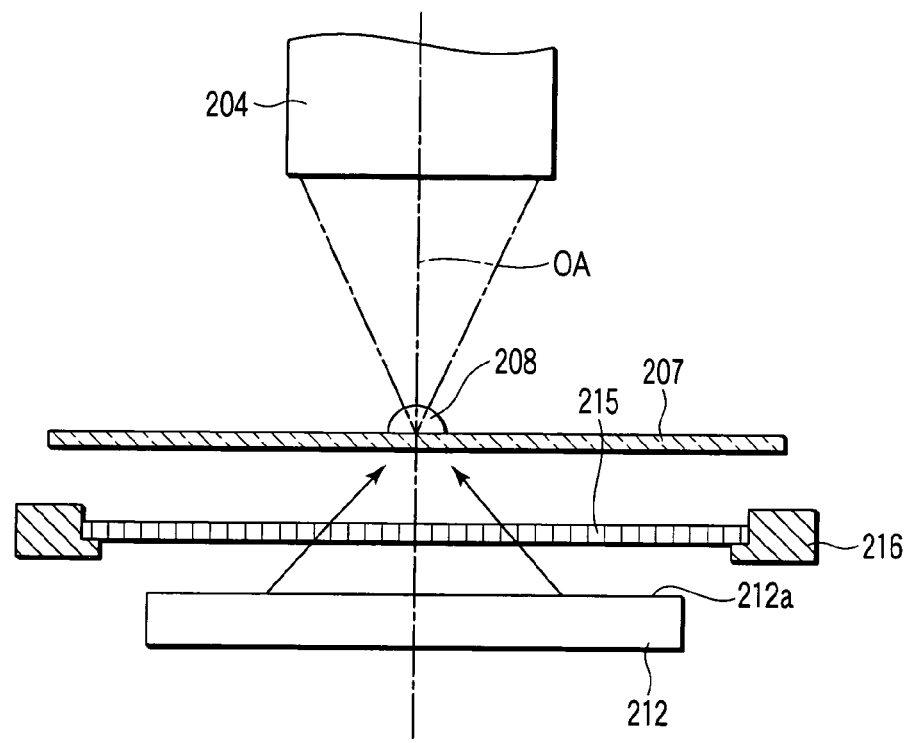
FIG. 28A is a cross-sectional view illustrating an effect on a shadow by the light orientation member depicted in FIG. 24.
Figure 28B:
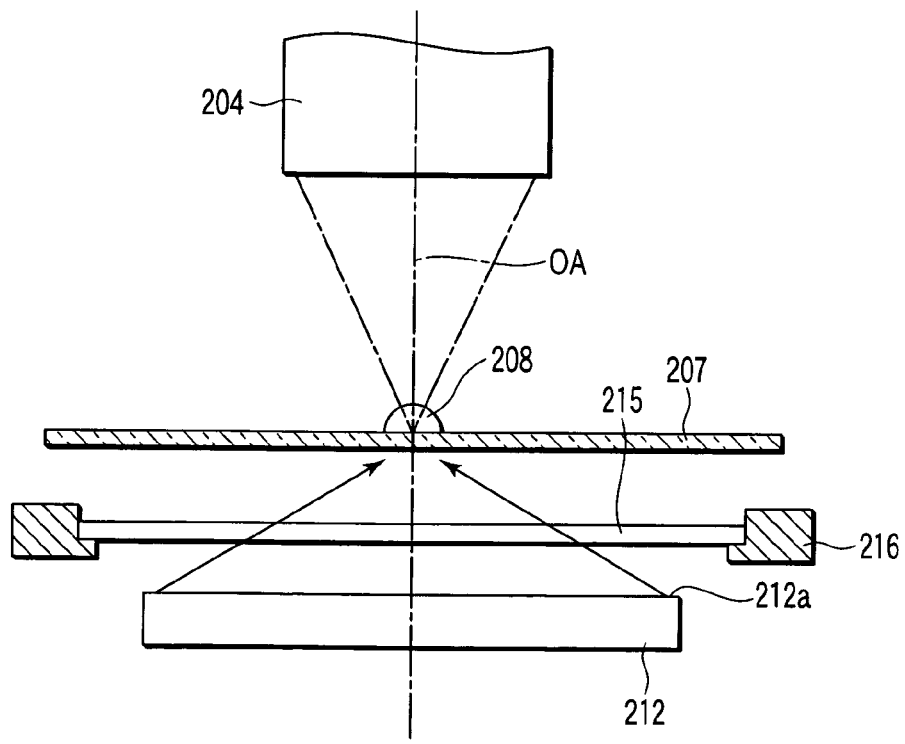
FIG. 28B is a cross-sectional view illustrating an effect on a shadow by the light orientation member depicted in FIG. 24.

It is to be noted that the light orientation member 215 can be applied to the illumination apparatus for the purpose of adjusting a state of the shadow of the sample 208 aside from dark field illumination. FIGS. 28A and 28B are cross-sectional views showing illumination states with respect to the sample 208. The illumination apparatus depicted in FIGS. 28A and 28B has a configuration in which the light shielding plate 210 and the cylindrical mirror 211 are removed from the illumination apparatus according to the sixth embodiment shown in FIG. 24. In this case, as shown in FIG. 28A, in the cross section perpendicular to the opaque members 215a, of light projected from each point on the light projection surface 212a, light having a large projection angle is shielded by the light orientation member 215, and light having a small projection angle illuminates the sample 208. On the contrary, as shown in FIG. 28B, in the cross section parallel to the opaque members 215a, the light having a small projection angle as well as the light having a large projection angle illuminates the sample 208. That is, the shadow is apt to be generated since an incidence angle of the light that is applied to the sample 208 is restricted in the cross section perpendicular to the opaque members 215a, and the shadow is hard to be generated in the cross section parallel to the opaque members 215a since the light having various incidence angles are applied to the sample 208. Therefore, a direction in which the shadow is provided to the sample 208 can be changed by rotating the light orientation member 215 about the optical axis OA by the rotation drive portion 216, and a microscopic examiner can observe the sample 208 with respect to the shadow in an arbitrary direction.

Figure 29:
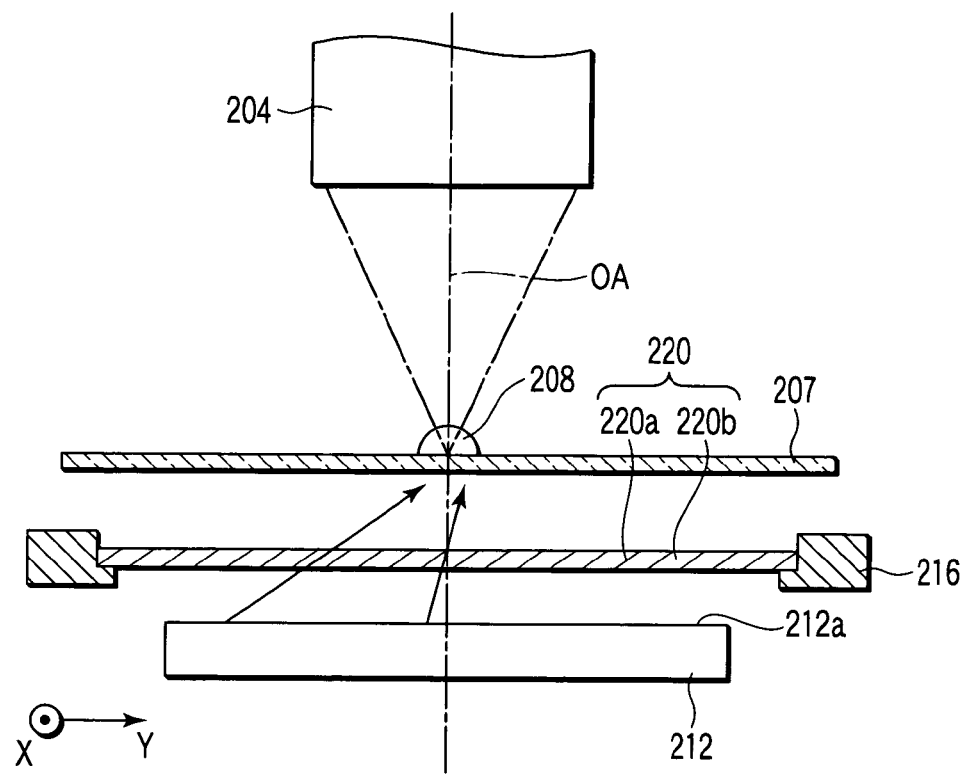
FIG. 29 is a cross-sectional view illustrating an effect that emphasizes the shadow by illumination using a light orientation member having inclined opaque members.

Furthermore, for example, as shown in FIG. 29, the shadow of the sample 208 may be emphasized by using a light orientation member 220 in which the opaque members 215a have a different inclination angle in place of the light orientation member 215. The light orientation member 220 is held in a state where opaque members 220a are inclined with respect to upper and lower surfaces of a transparent holding member 220b like the light orientation member 213 shown in FIG. 18A. By using such a light orientation member 220, oblique illumination in which all of light are oblique with respect to the optical axis OA can be performed for the sample 208, as shown in FIG. 29. For example, in FIG. 29, the shadow on the right-hand side of the sample 208 can be emphasized by this oblique illumination. Moreover, a direction of the shadow to be emphasized can be changed by rotating the light orientation member 220 about the optical axis OA by using the rotation drive mechanism 216, and a microscopic examiner can observe the sample 208 having the shadow emphasized in an arbitrary direction.

It is to be noted that the intensity of the shadow produced to the sample 208 can be adjusted by changing each gap between the respective opaque members 215a and 220a in the light orientation members 215 and 220. In this case, the shadow can be intensified by reducing each gap whilst the shadow can be weakened by increasing each gap.

Figure 30:
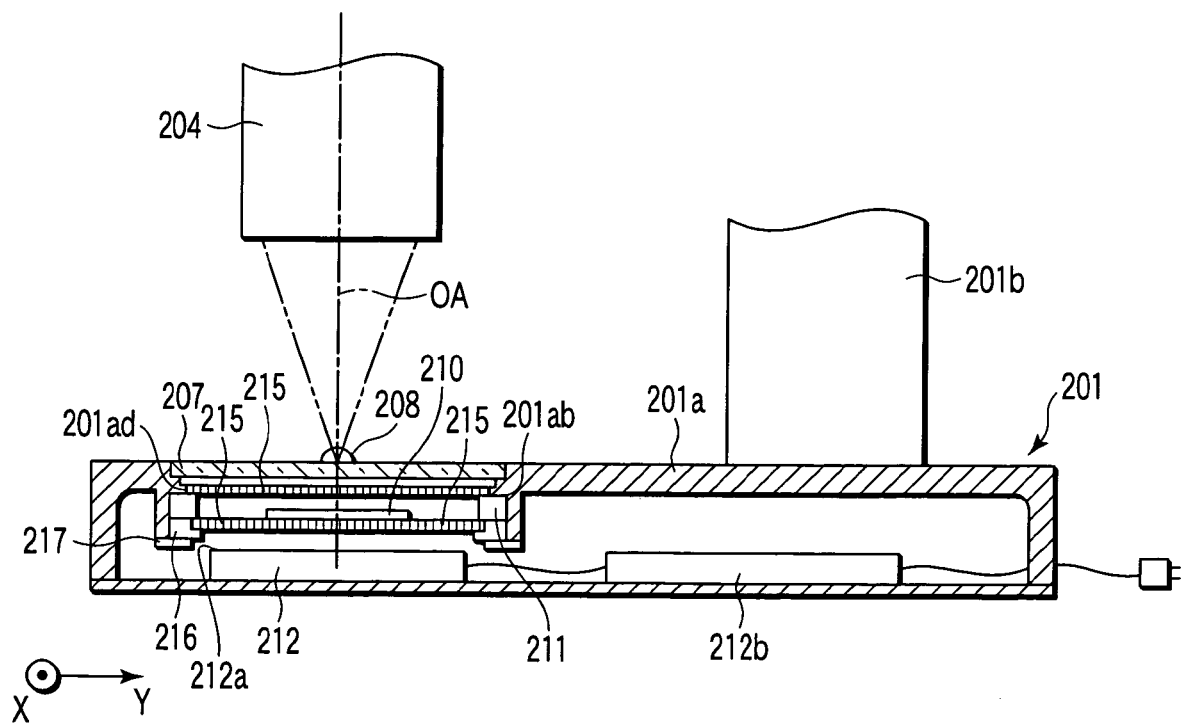
FIG. 30 is a schematic view showing a modified configuration of an illumination apparatus according to a sixth embodiment of the present invention.

Although the projected light having a large projection angle from the surface light source 212 is shielded in the cross section crossing the opaque members 215a by a light orientation member 215 in the illumination apparatus according to the sixth embodiment mentioned above, the light orientation members may be arranged in a layer form along the optical axis OA as shown in FIG. 30, for example. In the illumination apparatus depicted in FIG. 30, the light orientation member 215 is further arranged above the light shielding plate 210 and fitted and fixed in the hole portion 201ad in the base portion 201a in the structure of the illumination apparatus according to the sixth embodiment. The upper light orientation member 215 is fixed with the opaque members 215a being parallel to the X direction.

Figure 31A:
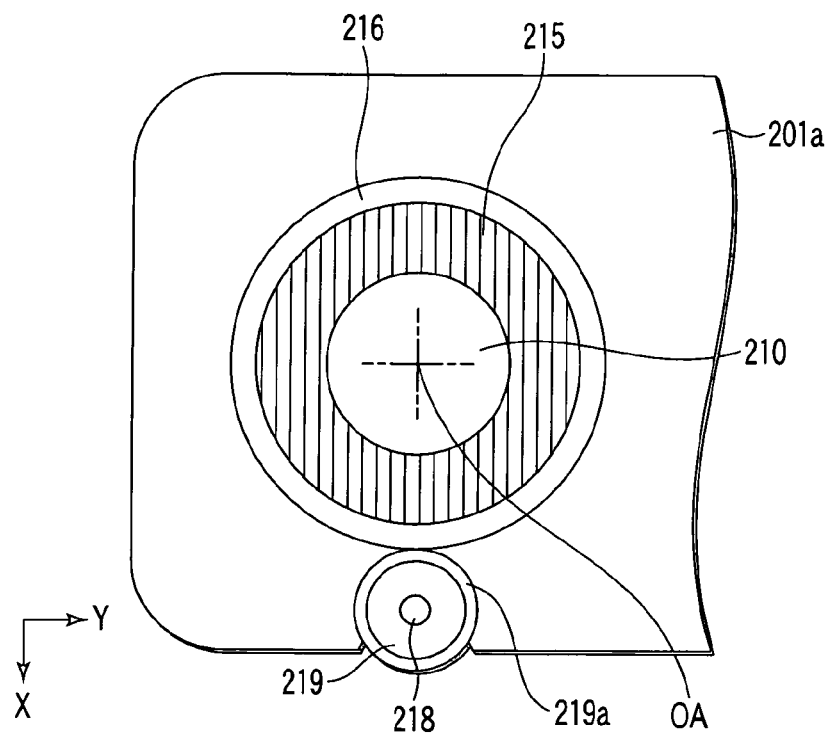
FIG. 31A is a plan view showing a configuration of the illumination apparatus depicted in FIG. 30.
Figure 31B:
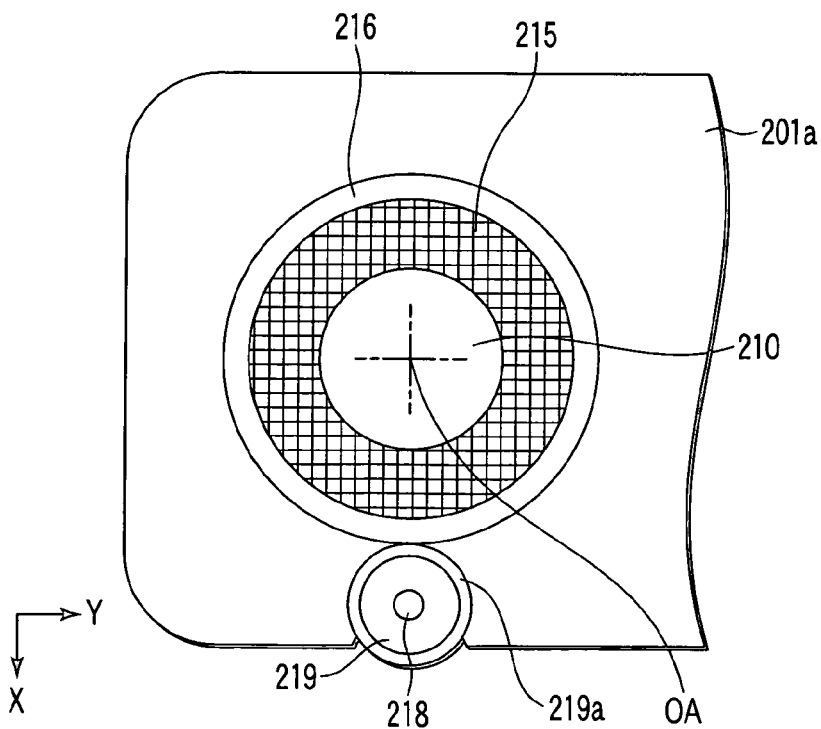
FIG. 31B is a plan view showing a configuration of the illumination apparatus depicted in FIG. 30.

FIGS. 31A and 31B are plan views showing relationships of the upper and lower light orientation members 215. FIG. 31A shows a case where the upper and lower opaque members 215a are parallel to each other, and FIG. 31B shows a case where the upper and lower opaque members 215a are perpendicular to each other. As shown in FIG. 31A, when directions of the upper and lower opaque members are matched with each other in the X direction, dark field illumination can be performed with respect to the sample 208 in the X direction. On the other hand, as shown in FIG. 31B, when a direction of the lower opaque members 215a matches with the Y direction and is perpendicular to the direction of the upper opaque member 215a, dark field illumination cannot be performed with respect to the sample 208 in both the X direction and the Y direction, and consequently illumination is not carried out with respect to the sample 208 at all. In the intermediate state of these states, the illumination light with respect to the sample 208 is gradually reduced as the lower light orientation member 215 is rotated by the rotation drive portion 216 and the direction of the lower opaque members 215a is shifted from the X direction to the Y direction.

In this manner, by using the two light orientation members 215 arranged in a layer form and rotating a light orientation member 215, a light quantity that is used to perform dark field illumination can be adjusted, and a microscopic examiner can observe the sample 208 with an arbitrary illumination light quantity in an adjustable range. It is to be noted that the two light orientation members 215 are used and one of these members can be rotated about the optical axis OA in this embodiment, but a light orientation member having a different gap, inclination and the like of the opaque members may be used, three or more such light orientation members may be used, and the light orientation members may be rotated about the optical axis OA. With such an arrangement, the illumination state with respect to the sample 208 can be adjusted in many ways, for example, a direction in which dark field illumination is performed or a state of the shadow can be adjusted.

It is to be noted that the light orientation members arranged in a layer form along the optical axis OA can be applied to the illumination apparatus for the purpose of adjusting a state of the shadow of the sample 208 or a light quantity of the illumination light aside from dark field illumination. In this case, for example, as shown in FIG. 32, there is adopted a structure in which the light shielding plate 210 and the cylindrical mirror 211 are removed and two light orientation members 215 are arranged along the optical axis OA, and the lower light drive member 215 is rotated by the rotation drive portion 216. As a result, directions of the upper and lower opaque members 215a can be relatively changed, a light quantity that is used to illuminate the sample 208 can be adjusted, and a state of the shadow with respect to the sample 208 can be adjusted. It is to be noted that, in this case, a light orientation member having a different gap, inclination and the like of the opaque members may be used, three or more such light orientation members may be used, and the light orientation members may be rotated about the optical axis OA.

Seventh Embodiment

A seventh embodiment according to the present invention will now be described. Although a set of the light orientation member, the light shielding plate and the cylindrical mirror is provided in the base portion 201a in the fourth to sixth embodiments, combinations of the light orientation member, the light shielding plate, the cylindrical mirror or the like are provided in the base portion and can be arbitrarily switched in the seventh embodiment.

Figure 33:
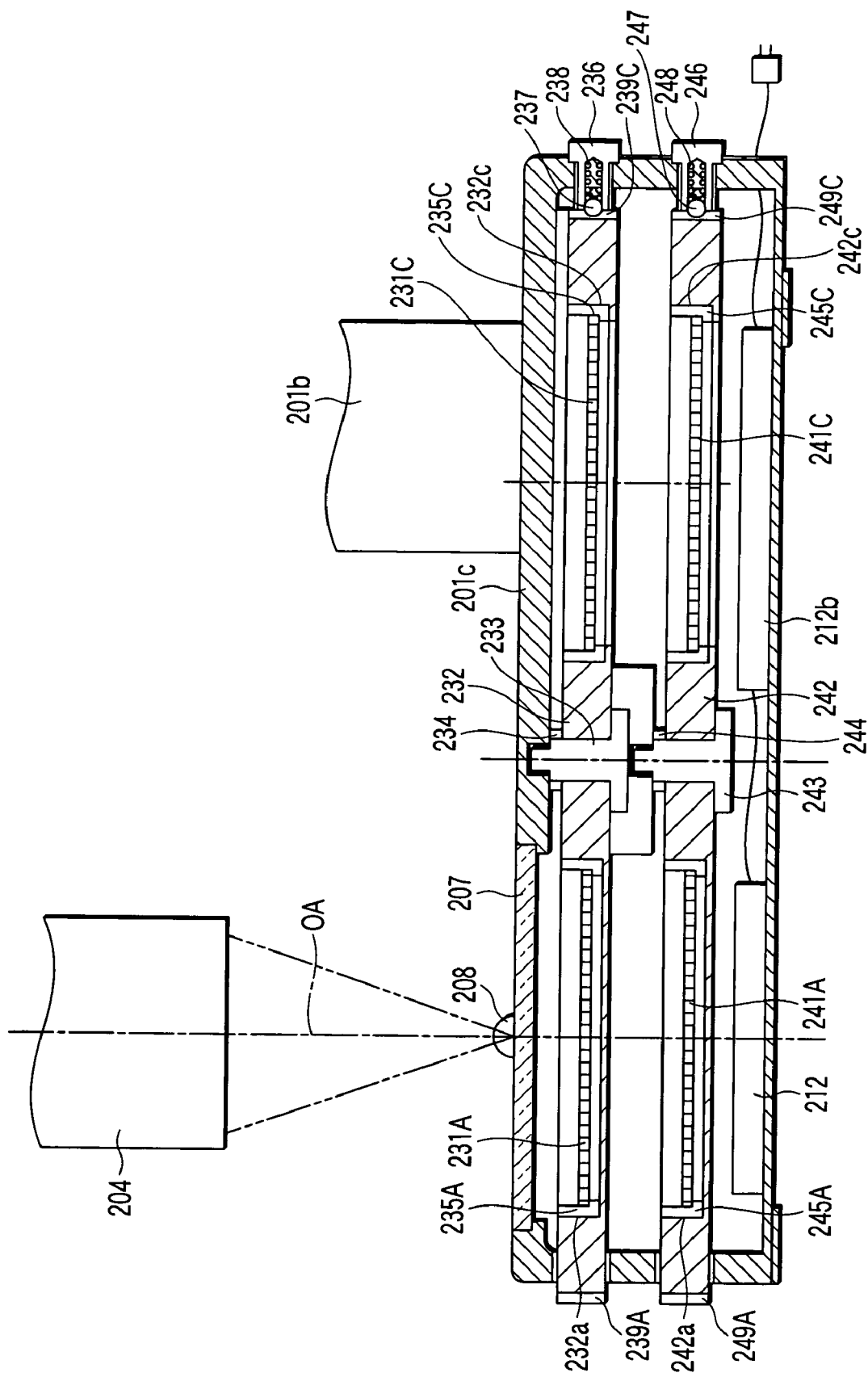
FIG. 33 is a schematic view showing a configuration of an illumination apparatus according to a seventh embodiment of the present invention.

FIG. 33 is a schematic view showing a configuration of an illumination apparatus and a partial configuration of a stereoscopic microscope according to the seventh embodiment of the present invention. As shown in FIG. 33, the stereoscopic microscope according to the seventh embodiment comprises a base portion 201c in place of the base portion 201a included in the stereoscopic microscope according to the fourth embodiment to the sixth embodiment, and a switching mechanism capable of switching combinations of the light orientation member, the light shielding plate, the cylindrical mirror and the like is provided in the base portion 201c. This switching mechanism is roughly configured to have two stages, i.e., upper and lower stages, and the upper switching mechanism has a turret 232, a rotary shaft 233, a spacer 234 and a plunger 236, whilst the lower switching mechanism likewise has a turret 242, a rotary shaft 243, a spacer 244 and a plunger 246. Any other structure excluding the base portion 201c and the switching mechanism is the same as those in the fourth embodiment to the sixth embodiment, and like reference numerals denote like constituent parts.

Figure 34:
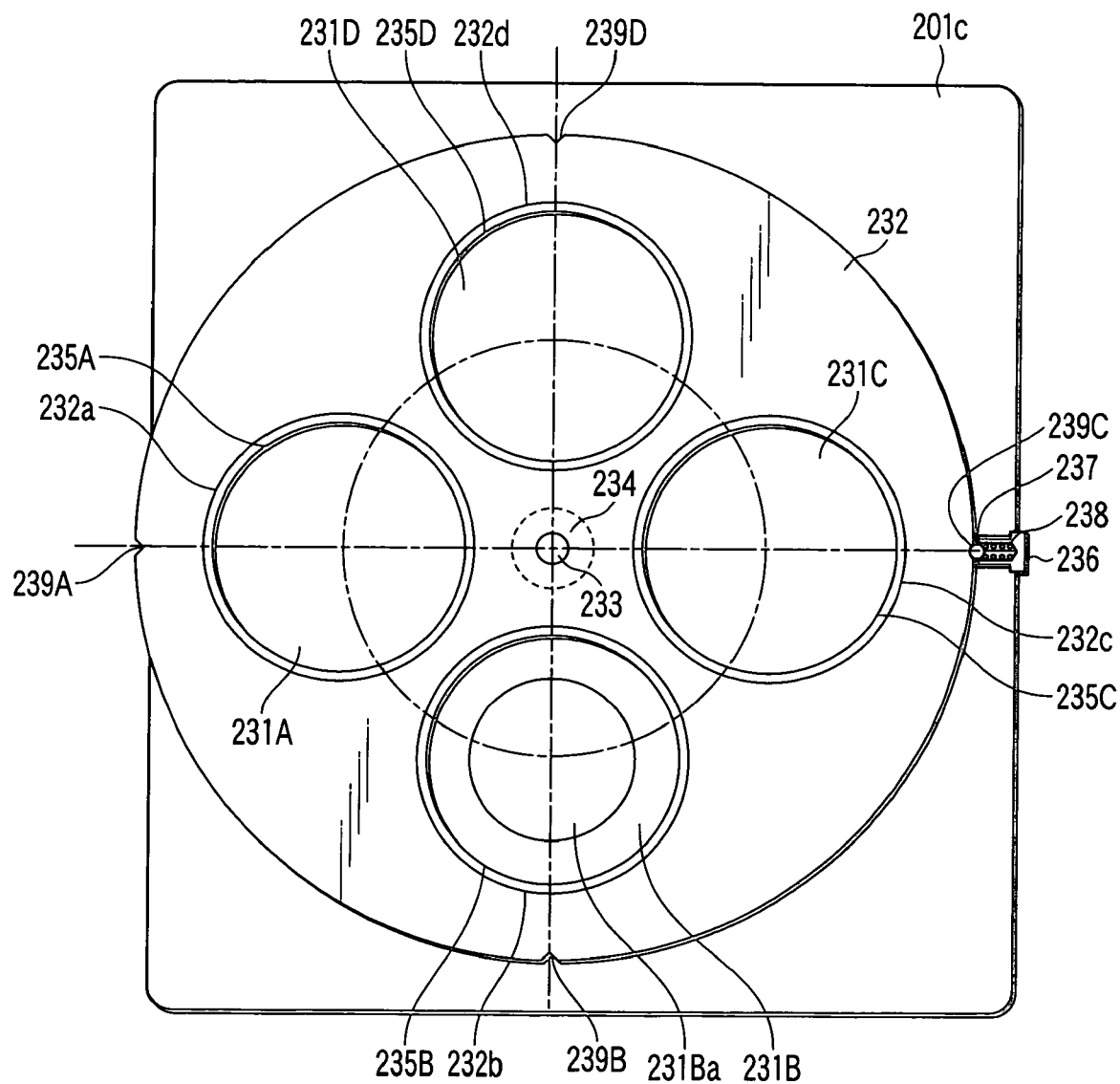
FIG. 34 is a plan view showing a partial configuration of the illumination apparatus depicted in FIG. 33.

FIG. 34 is a plan view showing the upper switching mechanism. As shown in FIGS. 33 and 34, in the upper switching mechanism, the turret 232 is supported by the base portion 201c in such a manner that the turret 232 can rotate about the rotary shaft 233. The spacer 232 is provided between the base portion 201c and the turret 232 so that the backlash when the turret 232 rotates is restricted. The turret 232 has four circular opening portions 232a to 232d, and light adjustment members 231A to 231D respectively slotted in cylindrical frames 235A to 235D are held in the opening portions 232a to 232d. The plunger 236 has a ball 237 and a spring 238, and is provided at a position facing the turret 232 at a side surface portion of the base portion 201c.

The turret 232 has four click grooves 239A to 239D at a outer peripheral side portion provided on lines connecting the rotary shaft 233 with the respective opening portions 232a to 232d and, when the ball 237 partially pushed out by a stretching force of the spring 238 falls in one of the click grooves 239A to 239D, rotation with respect to the base portion 201c is restricted and one of the light adjustment members 231A to 231D is arranged between the sample 208 and the surface light source 212. For example, as shown in FIG. 34, in a state where the ball 237 falls in the click groove 239C, the light adjustment member 231A is arranged between the sample 208 and the surface light source 212. When a force that is not less than a predetermined value in the rotating direction is applied to the turret 232, the ball 237 that has fallen in one of the click grooves 239A to 239D is pushed out, and the turret 232 again rotates. Thereafter, when the ball 237 falls in another groove of the click grooves 239A to 239D, rotation of the turret 232 is again restricted, and another light adjustment member of the light adjustment members 231A to 231D is arranged between the sample 208 and the surface light source 212. That is, the upper switching mechanism can selectively arrange one of the light adjustment members 231A to 231D on the optical axis OA. It is to be noted that a microscopic examiner can rotate the turret 232 by operating a portion protruding from the base portion 201c of the turret 232. Moreover, the light adjustment members 231A to 231D arranged between the sample 208 and the surface light source 212 can be rotated about the optical axis OA by using a non-illustrated rotation drive mechanism.

The lower switching mechanism is configured like the upper switching mechanism. The turret 242 is supported by the base portion 201c in such a manner that the turret 242 can rotate about the rotary shaft 243 by the rotary shaft 243, and the spacer 242 is provided so that the backlash when the turret 242 rotates is restricted. The turret 242 has four circular opening portions 242a to 242d, and light adjustment members 241A to 241D respectively slotted in cylindrical frames 245A to 245D are held in the opening portions 242a to 242d. The plunger 246 has a ball 247 and a spring 248, and is provided at a position facing the turret 242 at the side surface portion of the base portion 201c. The turret 242 has four click groove 249A to 249D at the outer peripheral side surface portion and, when the ball 247 falls in one of the click grooves 249A to 249D, rotation with respect to the base portion 201c is restricted, and one of the light adjustment members 214A to 241D is arranged between the sample 208 and the surface light source 212. That is, the lower switching mechanism can selectively arrange one of the light adjustment members 241A to 241D on the optical axis OA. It is to be noted that a microscopic examiner can rotate the turret 242 by operating a portion protruding from the base portion 201c of the turret 242. Additionally, the light adjustment members 214A to 241D arranged between the sample 208 and the surface light source 212 can be rotated about the optical axis OA by a non-illustrated rotation drive mechanism.

With such a switching mechanism having the two stages, i.e., the upper and lower stages, in the stereoscopic microscope according to the seventh embodiment, arbitrary one of the light adjustment members 241A to 241D can be combined with each of the light adjustment members 231A to 231D so that the light adjustment members can be arranged in a layer form between the sample 208 and the surface light source 212 along the optical axis OA. In this embodiment, the light orientation members 213, 214, 215 and 220, the resin plate 209 and the like described in conjunction with the fourth embodiment to the sixth embodiment can be applied to the light adjustment members 231A to 231D and 241A to 241D. In this case, a light shielding plate 231Ba may be provided in accordance with the light shielding plate 210 as shown in FIG. 34, for example. Further, inner surfaces of the cylindrical frames 235A to 235D and 245A to 245D may be determined as reflection surfaces in accordance with the cylindrical mirror 211. Furthermore, various kinds of filters such as a concentration filter, a color temperature filter, a wavelength selection filter, a polarization filter or the like may be applied as the light adjustment members 231A to 231D and 241A to 241D, or no member may be arranged to keep a vacant hole state. A microscopic examiner can perform various kinds of illumination such as dark field illumination, bright field illumination or oblique illumination with respect to the sample 208 and adjust a state of the shadow produced to the sample 208, a light quantity that is used to illuminate the sample 208 and the like in many ways by using various combinations of these members. In this case, the directionality such as a direction in which illumination is effected or a direction in which the shadow is produced can be provided, and this direction can be rotated about the optical axis OA.

It is to be noted that the turrets 232 and 242 respectively hold the four light adjustment members 231A to 231D and 241A to 241D, but they may hold two, three, five or more light adjustment members. Moreover, the base portion 201c comprises the switching mechanism having the two stages, i.e., the upper and lower stages, but it may comprise a switching mechanism having three or more stages. Additionally, the turrets 232 and 242 are used as this switching mechanism and the light adjustment members are switching by rotation driving, but the light adjustment members may be switched in a linear sliding manner. Further, these switching mechanisms may be automatically driven.

Furthermore, although the illumination apparatus according to the present invention is mounted in a binocular stereoscopic microscope in the first embodiment to the seventh embodiment, the illumination apparatus may be mounted in a monocular microscope, or it may be mounted in various kinds of optical microscope irrespective of applications of a biological microscope, an industrial microscope or the like.

Although the embodiments according to the present invention have been described with reference to the accompanying drawings, the present invention is not restricted thereto, and various modifications or changes may be applied without departing from the scope of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A transmission illumination apparatus for a microscope comprising:
   an optically transparent sample mount plate on which a sample is mountable;
   a surface light source that projects substantially uniform illumination light toward the sample mount plate;
   at least one light orientation member that restricts diffusion of the illumination light in relation to at least one direction, wherein the light orientation member is interposed between the sample mount plate and the surface light source, and wherein the light orientation member comprises a louver film that comprises a plurality of optically opaque micro louvers arranged in a transparent resin at equal intervals; and
   a rotation mechanism that rotates the light orientation member about an axis which is perpendicular to an illumination optical axis that is vertical with respect to a light emission surface of the surface light source.

2. The transmission illumination apparatus for a microscope according to claim 1, wherein a length D of a shortest side of a light emission portion of the surface light source, a distance L from a sample mount surface of the sample mount plate to the light emission surface of the surface light source, and a maximum angle (a half angle) A of the illumination light that falls on the sample satisfy the following expressions:

$$L < 0.7D$$

$$A < 0.9 \tan^{-1}(D/2L).$$

3. The transmission illumination apparatus for a microscope according to claim 1, wherein the microscope is a binocular stereoscopic microscope and the light orientation member restricts diffusion of the illumination light in a direction vertical to a plane containing two optical axes of the binocular stereoscopic microscope.

4. The transmission illumination apparatus for a microscope according to claim 1, further comprising a diffuser arranged between the sample mount plate and the light orientation member, wherein the diffuser diffuses the illumination light to the extent that the diffusion restriction effect for the illumination light by the light orientation member is not substantially affected.

5. The transmission illumination apparatus for a microscope according to claim 1, wherein the light orientation member comprises another louver film, wherein the louver films overlap each other, and wherein the another louver film comprises an optically transparent parallel-plate type transparent resin and a plurality of optically opaque micro louvers arranged in the transparent resin at equal intervals.

6. The transmission illumination apparatus for a microscope according to claim 5, wherein the microscope is a binocular stereoscopic microscope, and the light orientation member restricts diffusion of the illumination light in a direction perpendicular to a plane containing two optical axes of the binocular stereoscopic microscope more than diffusion of the illumination light in a direction parallel to the plane containing the two optical axes of the binocular stereoscopic microscope.

7. The transmission illumination apparatus for a microscope according to claim 6, wherein the louver film comprises micro louvers parallel to the plane containing the two optical axes of the binocular stereoscopic microscope and the another louver film comprises micro louvers perpendicular to the plane containing the two optical axes of the binocular stereoscopic microscope, and wherein each interval between the micro louvers parallel to the plane containing the two optical axes of the binocular stereoscopic microscope is narrower than each interval between the micro louvers perpendicular to the plane containing the two optical axes of the binocular stereoscopic microscope.

8. The transmission illumination apparatus for a microscope according to claim 6, wherein the louver films are rotatable about the illumination optical axis that is vertical to the light emission surface of the surface light source such that the louver films are arranged with the micro louvers being inclined with respect to the plane containing the two optical axes of the binocular stereoscopic microscope.

9. The transmission illumination apparatus for a microscope according to claim 8, further comprising a diffuser arranged between the sample mount plate and the light orientation member, wherein the diffuser diffuses the illumination light to the extent that the diffusion restriction effect for the illumination light by the light orientation member is not substantially affected.

10. The transmission illumination apparatus for a microscope according to claim 1, wherein the micro louvers of the louver film are perpendicular to parallel planes of the transparent resin.

11. The transmission illumination apparatus for a microscope according to claim 1, wherein the micro louvers of the louver film are inclined with respect to parallel planes of the transparent resin.

12. The transmission illumination apparatus for a microscope according to claim 11, wherein the microscope is a binocular stereoscopic microscope and the light orientation member restricts diffusion of the illumination light in a direction vertical to a plane containing two optical axes of the binocular stereoscopic microscope.

13. The transmission illumination apparatus for a microscope according to claim 1, comprising plural light orientation members, and a switching mechanism that selectively arranges one of the plural light orientation members as the at least one light orientation member between the sample mount plate and the surface light source.

14. The transmission illumination apparatus for a microscope according to claim 13, wherein the louver film of at least one of the light orientation members comprises an optically transparent parallelplate type transparent resin.

15. The transmission illumination apparatus for a microscope according to claim 14, wherein the micro louvers of the louver film are perpendicular to parallel planes of the transparent resin.

16. The transmission illumination apparatus for a microscope according to claim 15, wherein the louver film is arranged at a slant with respect to the sample mount plate.

17. The transmission illumination apparatus for a microscope according to claim 15, wherein the microscope is a binocular stereoscopic microscope and the light orientation member selectively arranged as the at least one light orientation member restricts diffusion of the illumination light in a direction vertical to a plane containing two optical axes of the binocular stereoscopic microscope.

18. The transmission illumination apparatus for a microscope according to claim 14, wherein the micro louvers of the louver film are inclined with respect to parallel planes of the transparent resin.

19. The transmission illumination apparatus for a microscope according to claim 18, wherein the microscope is a binocular stereoscopic microscope and the light orientation member selectively arranged as the at least one light orientation member restricts diffusion of the illumination light in a direction vertical to a plane containing two optical axes of the binocular stereoscopic microscope.

20. The transmission illumination apparatus for a microscope according to claim 14, further comprising a diffuser arranged between the sample mount plate and the light orientation member selectively arranged as the at least one light orientation member, wherein the diffuser diffuses the illumination light to the extent that the diffusion restriction effect for the illumination light by the at least one light orientation member is not substantially affected.

21. The transmission illumination apparatus for a microscope according to claim 13, wherein the light orientation member selectively arranged as the at least one light orientation member further comprises another louver film, wherein the louver films overlap each other, and wherein the another louver film comprises an optically transparent parallel-plate type transparent resin and a plurality of optically opaque micro louvers arranged in the transparent resin at equal intervals.

22. The transmission illumination apparatus for a microscope according to claim 21, wherein the microscope is a binocular stereoscopic microscope, and the light orientation member selectively arranged as the at least one light orientation member restricts diffusion of the illumination light in a direction perpendicular to a plane containing two optical axes of the binocular stereoscopic microscope more than diffusion of the illumination light in a direction parallel to the plane containing the two optical axes of the binocular stereoscopic microscope.

23. The transmission illumination apparatus for a microscope according to claim 22, wherein the micro louvers of the louver film of the light orientation member are parallel to the plane containing the two optical axes of the binocular stereoscopic microscope and the micro louvers of the another louver film are perpendicular to the plane containing the two optical axes of the binocular stereoscopic microscope, and wherein each interval between the micro louvers parallel to the plane containing the two optical axes of the binocular stereoscopic microscope is narrower than each interval between the micro louvers perpendicular to the plane containing the two optical axes of the binocular stereoscopic microscope.

24. The transmission illumination apparatus for a microscope according to claim 22, wherein the louver films are rotatable about the illumination optical axis that is vertical to the light emission surface of the surface light source such that the louver films are arranged with the micro louvers being inclined with respect to the plane containing the two optical axes of the binocular stereoscopic microscope.

25. The transmission illumination apparatus for a microscope according to claim 24, further comprising a diffuser arranged between the sample mount plate and the light orientation member selectively arranged as the at least one light orientation member, wherein the diffuser diffuses the illumination light to the extent that the diffusion restriction effect for the illumination light by the at least one light orientation member is not substantially affected.

* * * * *